United States Patent
Barnes Leon et al.

(10) Patent No.: US 7,856,454 B2
(45) Date of Patent: Dec. 21, 2010

(54) DATA MODEL FOR BUSINESS RELATIONSHIPS

(75) Inventors: Maria Theresa Barnes Leon, Fremont, CA (US); Richard Mark Exley, San Carlos, CA (US); Adam Sherman Christensen, Oakland, CA (US); Caroline Muralitharan, San Jose, CA (US); Lin Foong Lee, Fremont, CA (US); Silvia Eva Tittel, Dietersheim (DE); Nardo B. Catahan, Jr., S. San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1741 days.

(21) Appl. No.: 10/396,730

(22) Filed: Mar. 24, 2003

(65) Prior Publication Data

US 2007/0250408 A1     Oct. 25, 2007

Related U.S. Application Data

(60) Provisional application No. 60/435,566, filed on Dec. 20, 2002.

(51) Int. Cl.
*G06F 17/30* (2006.01)
(52) U.S. Cl. .................. 707/793; 707/797; 707/804
(58) Field of Classification Search .................. 707/102, 707/104.1, 101, 10, 22, 4, 6, 1, 14, 100, 624, 707/797, 796, 804, 793
See application file for complete search history.

(56) References Cited

U.S. PATENT DOCUMENTS

| | | | |
|---|---|---|---|
| 4,714,995 A | 12/1987 | Materna et al. | 364/200 |
| 5,220,500 A | 6/1993 | Baird et al. | 705/36 R |
| 5,311,438 A | 5/1994 | Sellers et al. | 700/96 |
| 5,349,643 A | 9/1994 | Cox et al. | 380/25 |
| 5,416,917 A | 5/1995 | Adair et al. | 707/203 |
| 5,446,880 A | 8/1995 | Balgeman et al. | 707/9 |
| 5,566,332 A | 10/1996 | Adair et al. | 707/101 |
| 5,646,862 A | 7/1997 | Jolliffe et al. | 703/1 |
| 5,699,527 A | 12/1997 | Davidson | 705/38 |
| 5,708,828 A | 1/1998 | Coleman | 395/785 |
| 5,724,575 A * | 3/1998 | Hoover et al. | 707/10 |
| 5,727,158 A | 3/1998 | Bouziane et al. | 709/225 |
| 5,742,588 A | 4/1998 | Thornberg et al. | 370/236 |

(Continued)

FOREIGN PATENT DOCUMENTS

JP      2001 256308       9/2001

(Continued)

OTHER PUBLICATIONS

Walter J Savitch, Java An Introduction to Computer Science & Programming, 2000, pp. 458-467.*

(Continued)

*Primary Examiner*—John R. Cottingham
*Assistant Examiner*—Sherief Badawi
(74) *Attorney, Agent, or Firm*—Campbell Stephenson LLP

(57) ABSTRACT

A data model that allows for relationships between entities, also referred to as parties, to be modeled as attributes of an entity and for customization of the data model in a manner that facilitates upgrading of the data model. The data model defines a party class that includes a party identifier and a list of relationships of that party with other parties. The relationships may include represented-by relationships, customer-of relationships, contact-of relationships, or employee-of relationships. The party class can be sub-classed (i.e., be a base class for a derived class) depending on the type of party that is being model.

16 Claims, 19 Drawing Sheets

U.S. PATENT DOCUMENTS

| | | | |
|---|---|---|---|
| 5,758,355 A | 5/1998 | Buchanan | 707/201 |
| 5,806,075 A | 9/1998 | Jain et al. | 707/201 |
| 5,930,764 A | 7/1999 | Melchione et al. | 705/10 |
| 5,953,710 A | 9/1999 | Fleming | 705/38 |
| 5,970,490 A | 10/1999 | Morgenstern | 707/10 |
| 6,032,136 A | 2/2000 | Brake et al. | 705/41 |
| 6,053,947 A * | 4/2000 | Parson | 703/14 |
| 6,178,418 B1 | 1/2001 | Singer | 707/3 |
| 6,216,130 B1 | 4/2001 | Hougaard et al. | 707/10 |
| 6,226,649 B1 | 5/2001 | Bodamer et al. | 707/104.1 |
| 6,233,566 B1 | 5/2001 | Levine et al. | 705/36 R |
| 6,236,997 B1 | 5/2001 | Bodamer et al. | 707/10 |
| 6,275,812 B1 | 8/2001 | Haq et al. | 705/11 |
| 6,336,124 B1 | 1/2002 | Alam et al. | 715/523 |
| 6,341,289 B1 * | 1/2002 | Burroughs et al. | 707/104.1 |
| 6,343,275 B1 | 1/2002 | Wong | 705/26 |
| 6,377,952 B1 | 4/2002 | Inohara et al. | 707/101 |
| 6,385,620 B1 | 5/2002 | Kurzius et al. | 707/104.1 |
| 6,434,567 B1 | 8/2002 | De La Huerga | 707/102 |
| 6,463,430 B1 | 10/2002 | Brady et al. | 707/3 |
| 6,556,950 B1 | 4/2003 | Schwenke et al. | 702/183 |
| 6,591,260 B1 | 7/2003 | Schwarzhoff et al. | 702/2 |
| 6,631,382 B1 | 10/2003 | Kouchi et al. | 707/102 |
| 6,668,253 B1 | 12/2003 | Thompson et al. | 707/10 |
| 6,754,679 B2 | 6/2004 | Oheda | 707/201 |
| 6,778,651 B1 | 8/2004 | Jost et al. | 379/201.01 |
| 6,792,431 B2 | 9/2004 | Tamboli et al. | 707/102 |
| 6,826,542 B1 | 11/2004 | Virgin et al. | 705/34 |
| 6,826,568 B2 * | 11/2004 | Bernstein et al. | 707/6 |
| 6,828,963 B1 | 12/2004 | Rappoport | 345/419 |
| 6,883,004 B2 | 4/2005 | Bahl et al. | 707/10 |
| 6,889,260 B1 | 5/2005 | Hughes | 709/246 |
| 6,898,783 B1 * | 5/2005 | Gupta et al. | 717/105 |
| 6,912,719 B2 | 6/2005 | Elderon et al. | 719/319 |
| 6,944,514 B1 | 9/2005 | Matheson | 700/98 |
| 6,947,947 B2 | 9/2005 | Block et al. | 707/102 |
| 6,996,776 B1 | 2/2006 | Makely et al. | 715/207 |
| 7,043,687 B2 | 5/2006 | Knauss et al. | 715/513 |
| 7,099,350 B2 | 8/2006 | Peterson | 370/465 |
| 7,111,010 B2 * | 9/2006 | Chen | 707/102 |
| 7,111,077 B1 | 9/2006 | Starkovich et al. | 709/246 |
| 7,124,112 B1 | 10/2006 | Guyan et al. | 705/44 |
| 7,133,882 B1 | 11/2006 | Pringle et al. | 1/1 |
| 7,139,766 B2 * | 11/2006 | Thomson et al. | 707/101 |
| 7,143,100 B2 * | 11/2006 | Carlson et al. | 707/101 |
| 7,257,594 B2 | 8/2007 | Tamboli et al. | 701/101 |
| 7,287,041 B2 | 10/2007 | Barnes-Leon et al. | 707/104.1 |
| 7,337,192 B2 | 2/2008 | Stark et al. | 707/104.1 |
| 2001/0011245 A1 | 8/2001 | Duhon | 705/38 |
| 2001/0051907 A1 | 12/2001 | Kumar et al. | 705/36 |
| 2002/0007343 A1 | 1/2002 | Oyama et al. | 705/39 |
| 2002/0019765 A1 | 2/2002 | Mann et al. | 705/11 |
| 2002/0023004 A1 * | 2/2002 | Hollander et al. | 705/22 |
| 2002/0035431 A1 | 3/2002 | Ell | 702/5 |
| 2002/0035488 A1 * | 3/2002 | Aquila et al. | 705/4 |
| 2002/0040313 A1 | 4/2002 | Hunter et al. | 705/9 |
| 2002/0040339 A1 | 4/2002 | Dhar et al. | |
| 2002/0085020 A1 | 7/2002 | Carroll, Jr. | 345/700 |
| 2002/0095456 A1 | 7/2002 | Wensheng | 709/203 |
| 2002/0116234 A1 | 8/2002 | Nagasawa | 705/5 |
| 2002/0123983 A1 | 9/2002 | Riley et al. | 707/1 |
| 2002/0138582 A1 | 9/2002 | Chandra et al. | 709/206 |
| 2002/0169867 A1 | 11/2002 | Mann et al. | 709/224 |
| 2002/0174417 A1 | 11/2002 | Sijacic et al. | 717/147 |
| 2002/0178077 A1 | 11/2002 | Katz et al. | 705/26 |
| 2002/0184085 A1 | 12/2002 | Lindia et al. | 705/11 |
| 2002/0184148 A1 | 12/2002 | Kahn et al. | 705/40 |
| 2002/0188513 A1 | 12/2002 | Gil et al. | 705/22 |
| 2002/0188538 A1 | 12/2002 | Robertson et al. | 705/35 |
| 2003/0023580 A1 | 1/2003 | Braud et al. | 703/3 |
| 2003/0051047 A1 | 3/2003 | Horel et al. | 709/237 |
| 2003/0071852 A1 | 4/2003 | Stimac | 345/810 |
| 2003/0088442 A1 | 5/2003 | Michael et al. | 705/3 |
| 2003/0097642 A1 | 5/2003 | Arai et al. | 716/1 |
| 2003/0131018 A1 | 7/2003 | Godoy et al. | 707/104.1 |
| 2003/0163597 A1 | 8/2003 | Hellman et al. | 709/316 |
| 2003/0163603 A1 * | 8/2003 | Fry et al. | 709/328 |
| 2003/0229529 A1 | 12/2003 | Mui et al. | 705/8 |
| 2004/0015515 A1 | 1/2004 | Beisiegel et al. | 707/103 Y |
| 2004/0034661 A1 * | 2/2004 | Barron et al. | 707/104.1 |
| 2004/0039576 A1 | 2/2004 | He et al. | 705/1 |
| 2004/0093351 A1 | 5/2004 | Lee et al. | 707/104.1 |
| 2004/0122826 A1 * | 6/2004 | Mackie | 707/100 |
| 2004/0128188 A1 | 7/2004 | Leither et al. | 705/11 |
| 2004/0162773 A1 | 8/2004 | Del Rey et al. | 705/36 |
| 2004/0199536 A1 | 10/2004 | Barnes-Leon et al. | 705/26 |
| 2004/0215503 A1 | 10/2004 | Allpress et al. | 705/11 |
| 2004/0249854 A1 | 12/2004 | Barnes-Leon et al. | 703/103 Y |
| 2005/0021391 A1 | 1/2005 | Lu et al. | 705/11 |
| 2005/0091249 A1 | 4/2005 | Hanson et al. | 707/101 |
| 2005/0160361 A1 | 7/2005 | Young | 715/513 |
| 2006/0271446 A1 | 11/2006 | Leon et al. | 705/26 |
| 2007/0033531 A1 | 2/2007 | Marsh | 715/738 |
| 2007/0203710 A1 | 8/2007 | Habichler et al. | 705/1 |
| 2007/0208577 A1 | 9/2007 | Leon et al. | 705/1 |
| 2007/0208878 A1 | 9/2007 | Barnes-Leon et al. | 709/246 |
| 2007/0214020 A1 | 9/2007 | Srinivasan et al. | 705/4 |
| 2007/0214063 A1 | 9/2007 | Kahlon et al. | 705/28 |
| 2007/0214064 A1 | 9/2007 | Kahlon et al. | 705/28 |
| 2007/0214065 A1 | 9/2007 | Kahlon et al. | 705/28 |
| 2007/0226037 A1 | 9/2007 | Garg et al. | 705/1 |
| 2007/0226049 A1 | 9/2007 | Muralitharan et al. | 705/11 |
| 2007/0226093 A1 | 9/2007 | Chan et al. | 705/38 |
| 2007/0250408 A1 | 10/2007 | Barnes-Leon et al. | 707/100 |
| 2007/0250419 A1 | 10/2007 | Kumar et al. | 705/34 |
| 2007/0265944 A1 | 11/2007 | Catahan, Jr. et al. | 705/30 |

FOREIGN PATENT DOCUMENTS

| | | |
|---|---|---|
| WO | WO 0143031 | 6/2001 |
| WO | WO 01/88759 A1 | 11/2001 |
| WO | WO 03/003641 A2 | 1/2003 |

OTHER PUBLICATIONS

Walter J Savitch, Java An Introduction to Computer Science & Programming, 2000, p. 1.*

Walter J Savitch, Java an Introduction to Computer Science & Programming, 2000, p. 478.*

Routledge et al., UML and XML Schema, 2002, pp. 1-10.*

"Cross Access Introduces SERIESfour; Offers Native, Fast, Scalable Legacy Data Connectivity for Data Marts, ERP Applications," PR Newswire; New York; Jan. 18, 1999; pp. 1-3. Downloaded from http://proquest.umit.com.

Hardwick, Martin, David L. Spooner, Rom Rando, and K.C. Morris, "Sharing Manufacturing Information in Virtual Enterprises;" Communication of the ACM; vol. 39, No. 2; Feb. 1996; pp. 46-54. Downloaded from http://delivery.acm.org.

Kappelhoff, Ralph, "Integration of ERP to the Final Control Elements;" ISA Transactions; 1998; vol. 36, No. 4; pp. 229-238. Downloaded from http://www.sciencedirect.com.

Nori, Anil K. et al., "Bringing Objects to the Mainstream," Compcon Proceedings, IEEE San Jose, California, Feb. 23-26, 1997, pp. 136-142.

PTC: Siebel Systems and PTC create strategic alliance to leverage entriched information across product development, sales and service; Combination of Siebel eBusiness Applications and PTC Collaborative Product Development solutions to deliver competitive advantage, M2 Presswire, Coventry: Jan. 24, 2002, 3 pages (retrieved from ProQuest.com).

Wilson, J.R., "Aerospace Looks for Lift from e-commerce," Intervia, Geneva, Jul./Aug. 2001; vol. 56, Issue 655, 6 pages (retrieved from ProQuest.com).

XML/EDI Group; "Guidelines for using XML for Electronic Data Interchange." Presented at XML One-San Jose, Sep./Oct. 2001. 'the eBusiness framework'; Downloaded from http://web.archive.org/web/20040413182700/http://www.xmledi-group.org/; 3 pages.

NPL_XML_Schema_CE.pdf, A tutorial published by the SML governing body of w3.org regarding the use of SML Schemas and Complex Data Elements. Downloaded on Jun. 10, 2009 from http://www.w3schools.com/Schema/schema_intro.asp? and http://www.w3schools.com/Schema/schema_complex.asp? and http://www.w3.schools.com/Schema/schema_complex_empty.asp?; 7 pages.

* cited by examiner

DATA MODEL FOR BUSINESS RELATIONSHIPS

CROSS-REFERENCE TO RELATED APPLICATION(S)

This application claims the benefit of U.S. Provisional Patent Application No. 60/435,566, filed Dec. 20, 2002, which is incorporated herein in its entirety by reference.

TECHNICAL FIELD

The described the technology relates generally to data modeling and particularly to modeling of business relationships.

BACKGROUND

Various business entities, such as companies, store information electronically in furtherance of their business needs. These companies may have extensive databases of information that include customer tables, supplier tables, employee tables, and so on. The schemas and data models associated with these databases may be customized to help meet the business needs of the company. For example, an automotive manufacturer may organize information about its customers in a way that is very different from the way that an online bookstore may organize information about its customers. Even within a single company, that company may use many different application programs that employ very different schemas and data models. For example, a customer relationship management application program may use a data model that is very different from the data model used by an accounting program. The use of customized data models by a company and by applications within the company has the advantage that it allows information to be modeled in a way that is appropriate for business needs of the company. Unfortunately, because of this diversity in the data models, it is not easy for the company to share its information with other companies or for applications to share their information.

Various attempts have been made to define standard data models so that information can be more easily shared between companies and applications. For example, the Open Applications Group has defined a standard data model that can be used by companies and applications when sharing information. A problem with such data models is that they did not provide effective ways to model relationships between various parties, such as a person or a company. In addition, if a company or an application developer wants to customize the standard data model, the customized data model may not be compatible with future upgrades of the standard data model. It would be desirable to have a data model that would more effectively model relationships and facilitate the upgrading of customizations of the data model.

DETAILED DESCRIPTION

Figure 1:
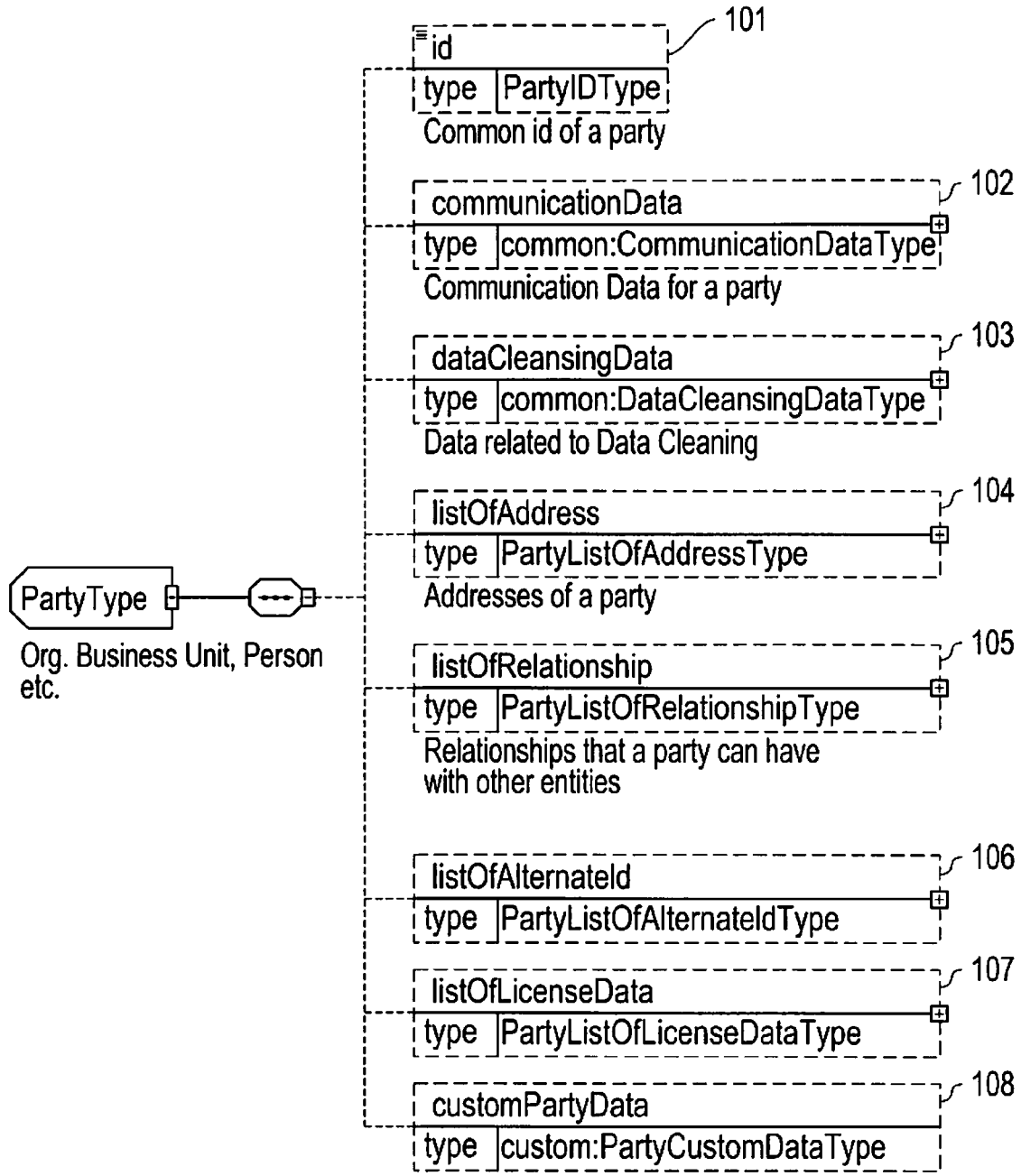
FIG. 1 illustrates the highest level data elements of the party class.

A data model that allows for relationships between entities, also referred to as parties, to be modeled as attributes of an entity and for customization of the data model in a manner that facilitates upgrading of the data model is provided. In one embodiment, the data model defines a party class that includes a party identifier and a list of relationships of that party with other parties. The relationships may include represented-by relationships, customer-of relationships, contact-of relationships, or employee-of relationships. The party class can be sub-classed (i.e., be a base class for a derived class) depending on the type of party that is being model. The types of parties may include a business unit, household, organization, person, and so on. A business unit is generally a corporation, division, or group of individuals that provides services or products for the organization (e.g., company) that is using the data model. A household is a group of individuals who commonly share the same dwelling and compose a family or social unit. An organization is an institution, corporation, an administrative and functional structure with the common purpose, or other grouping of people. A person is an individual. A customer is a person, organization, or household who uses products or services provided by a business unit. An employee is a person employed by an organization. A contact is a person serving as a representative, messenger, or liaison for an organization or another person. A representative is a person who represents an organization or another person. The data model models the relationships as attributes associated with a party. For example, a person may have a customer relationship with several different business units. In such a case, the data model specifies that information relating into each business unit would be associated with that person. In one embodiment, the data model is specified using a schema language such as XML Schema.

In one embodiment, the data model defines a hierarchy of the data elements for describing a party. The data model may define data elements that are complex. A complex data element is a data element that comprises data sub-elements. For example, an address data element may be a complex data element that includes street, city, and state data sub-elements. The data model may specify custom data elements at various places within the hierarchy of data elements. A custom data element is of a custom data element type. The custom data element type initially defines no data elements. The data model can be customized by defining custom data elements for the custom data element type. For example, the data elements relating to the relationship of an employee of an organization may have a custom data element through which data elements relating to the salary history of the employee can be defined. Because the custom data elements are defined at various places within the hierarchy, the customizations of the data model can be associated with related data elements within the hierarchy.

Table 1 lists the data elements of a party class in one embodiment. The indentation of the data element names indicates data sub-elements of complex data elements. For example, the addressRelationshipData data element of line 10 includes the data sub-elements of endDate, occupancyType-Code, startDate, and typeCode. Although not shown in the table, these data sub-elements may themselves be complex data elements with data sub-elements. For example, the start-Date data element of line 13 could have data sub-elements of year, month, and day. Lines 28-85 list the data elements that define the various relationships of the party. Lines 15, 35, 57, 63, 70, 84, 85, and 86 list customData elements of a type appropriate for the enclosing complex data element. For example, the customData element defined at line 35 allows for custom data to be defined that relates to the enclosing representedBy complex data element.

TABLE 1

| | | |
|---|---|---|
| 1. | party | |
| 2. | id | |
| 3. | communicationData | |
| 4. | ... | |
| 5. | dataCleansingData | |
| 6. | ... | |
| 7. | listOfAddress | |
| 8. | address | |
| 9. | id | |
| 10. | baseData | |
| 11. | ... | |
| 12. | addressRelationshipData | |
| 13. | endDate | |
| 14. | occupancyTypeCode | |
| 15. | startDate | |
| 16. | typeCode | |
| 17. | customData | |
| 18. | listOfAlternateId | |
| 19. | alternateId | |
| 20. | listOfLicenseData | |
| 21. | classCode | |
| 22. | countryCode | |
| 23. | expiryDate | |
| 24. | issueDate | |
| 25. | number | |
| 26. | province | |
| 27. | stateCode | |
| 28. | suspensionEndDate | |
| 29. | typeCode | |
| 30. | listOfRelationship | |
| 31. | listOfRepresentedBy | |
| 32. | representedBy | |
| 33. | person | |
| 34. | relationshipData | |
| 35. | jobTitle | |
| 36. | statusCode | |
| 37. | customData | |
| 38. | listOfCustomerOf | |
| 39. | customerOf | |
| 40. | busUnit | |
| 41. | relationshipData | |

TABLE 1-continued

| | | |
|---|---|---|
| 42. | historyCode | |
| 43. | satisfactionRatingCode | |
| 44. | statusCode | |
| 45. | typeCode | |
| 46. | listOfBillingProfile | |
| 47. | id | |
| 48. | basedData | |
| 49. | billTypeCode | |
| 50. | billFrequencyCode | |
| 51. | billDay | |
| 52. | budgetBillFlag | |
| 53. | mediaTypeCode | |
| 54. | manualBillCount | |
| 55. | manualBillVerificationReason | |
| 56. | | |
| 57. | paymentMethodData | |
| 58. | relatedparty | |
| 59. | customData | |
| 60. | householdCustomerData | |
| 61. | demographicSegmentCode | |
| 62. | lifecycleStatusCode | |
| 63. | marketSegmentCode | |
| 64. | annualRevenue | |
| 65. | customData | |
| 66. | listOfContactOf | |
| 67. | contactOf | |
| 68. | org | |
| 69. | relationshipData | |
| 70. | jobTitle | |
| 71. | statusCode | |
| 72. | customData | |
| 73. | listOfEmployeeOf | |
| 74. | employeeOf | |
| 75. | org | |
| 76. | relationshipData | |
| 77. | buildingNumber | |
| 78. | classCode | |
| 79. | cubicleNumber | |
| 80. | currentEmployerFlag | |
| 81. | endDate | |
| 82. | jobTitle | |
| 83. | number | |
| 84. | occupationCode | |
| 85. | shiftCode | |
| 86. | startDate | |
| 87. | statusCode | |
| 88. | typeCode | |
| 89. | userName | |
| 90. | yearsEmployed | |
| 91. | yearsWithEmployer | |
| 92. | methodOfContract | |
| 93. | listOfEmploymentDate | |
| 94. | listOfPositions | |
| 95. | listOfJobs | |
| 96. | customData | |
| 97. | customData | |
| 98. | customData | |

Table 2 lists the data elements of the business unit class in one embodiment. The business unit class inherits the party class as indicated by line 1.

TABLE 2

| | | |
|---|---|---|
| 1. | busunit:party | |
| 2. | baseData | |
| 3. | name | |
| 4. | customData | |

Table 3 lists the data elements of the household class in one embodiment. The household class inherits the party class as indicated by line 1.

TABLE 3

| | |
|---|---|
| 1. | household:party |
| 2. | base data |
| 3. | name |
| 4. | familyTypeCode |
| 5. | numberOfPeople |
| 6. | annualIncome |
| 7. | netWorth |
| 8. | uniqueName |
| 9. | customData |

Table 4 lists the data elements of the organization class in one embodiment. The organization class inherits the party class as indicated by line 1.

TABLE 4

| | |
|---|---|
| 1. | org:party |
| 2. | baseData |
| 3. | name |
| 4. | dunsNumber |
| 5. | customData |

Table 5 lists the data elements of the person class in one embodiment. The person class inherits the party class as indicated by line 1.

TABLE 5

| | |
|---|---|
| 1. | person:party |
| 2. | baseData |
| 3. | firstName |
| 4. | lastName |
| 5. | fullName |
| 6. | middleName |
| 7. | shortName |
| 8. | nameSuffix |
| 9. | titleCode |
| 10. | genderCode |
| 11. | maritalStatusCode |
| 12. | birthDate |
| 13. | annualIncomeAmount |
| 14. | dependents |
| 15. | ethnicityCode |
| 16. | homeOwnerFlag |
| 17. | customData |

Each of the types of a party specify a custom data element for that type. For example, the customData data element of the person Class Table 5 may be defined as being a PersonCustomDataType. If so, the person class can be customized by adding data elements to the definition of the PersonCustomDataType. The definition may be stored in a file that is separate from the file in which the person Class is defined. A portion of an XML schema that defines the custom data a personClass is

```
<xs:element name = "customData" type =
    "custom:PersonCustomDataType" minOccurs = "0" />
``` where "custom:" specifies a file that contains the definition of PersonCustomDataType, which may be

```
<xs:complexType name = "PersonCustomDataType">
    <xs:annotation
        <xs:documentation>
            Define the custom data element for this
            type following this annotation
        <xs:documentation>
    </xs:annotation>
</xs:complexType>
```

FIGS. 1-12 are block diagrams illustrating the data model in one embodiment. One skilled in the art will appreciate that the names of each data element is descriptive of the information stored in the data element FIG. 1 illustrates the highest level data elements of the party class in one embodiment. The highest level data elements include id 101, communicationData 102, dataCleansingData 103, listOfAddress 104, listOfRelationship 105, listOfAlternateId 106, listOfLicenseData 107, and customPartyData 108 data elements. The id data element may be a unique identifier of a party. The communicationData data element includes listOfPhoneNumber, listOfEmail, and listOfWebPage data elements that provides communication information relating to the party. The dataCleansingData data element indicates data cleansing for the party is enabled. Data cleansing typically relates to ensure that data of the party is valid and in a correct format. The listOfAddress data element contains a list of addresses for the party (e.g., P.O. box and residence address for a household). The listOfRelationship data element defines data elements for describing various types of relationships. The listOfAlternateId data element contains a list of alternate identifiers (e.g., social security number and tax number) for the party. The listOfLicenseData data element contains a list of various licenses of the party (e.g., driver's license and professional license). The customPartyData data element initially contains no data elements, but custom data elements can be added by defining data elements in the PartyCustomDataType.

Figure 2:
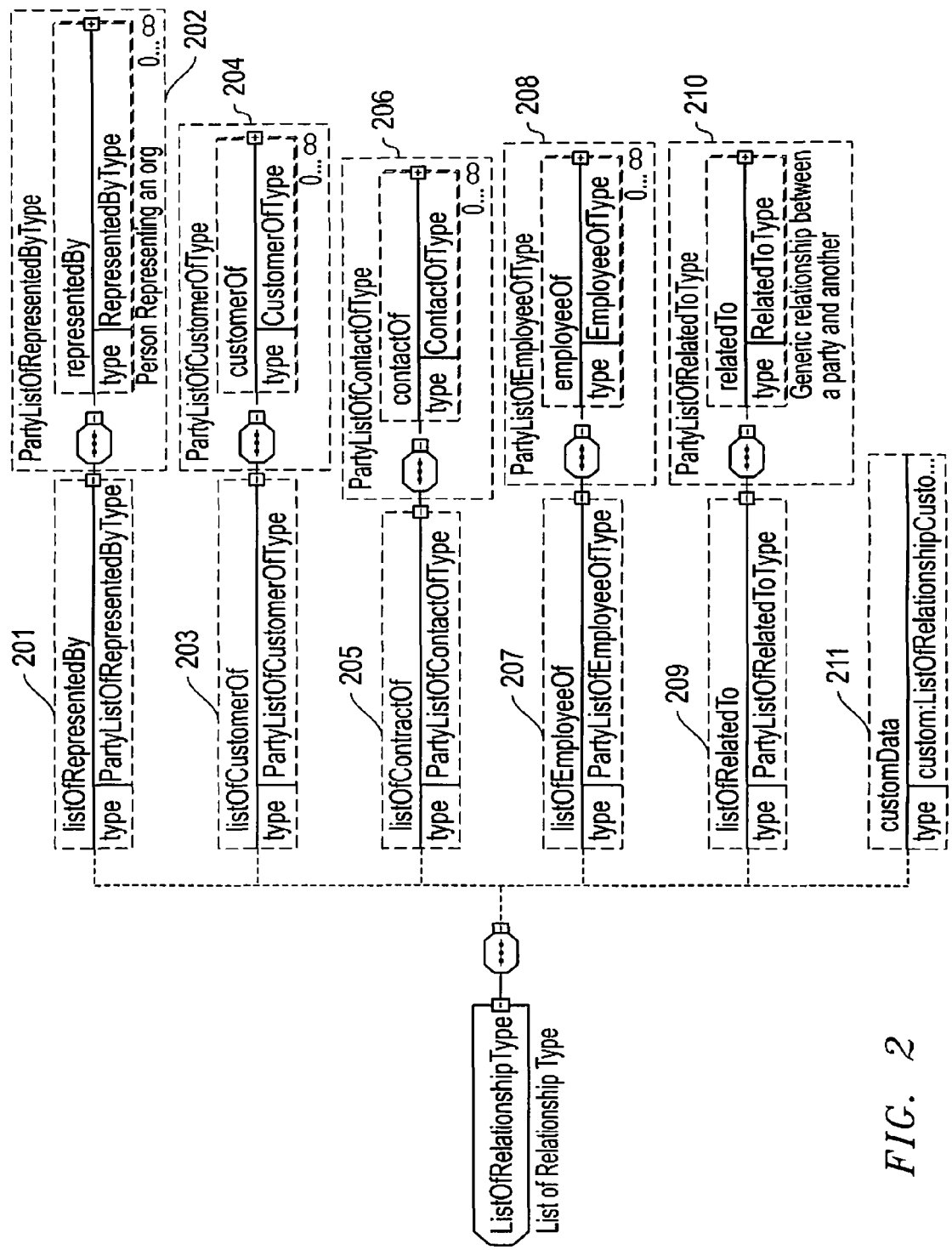
FIG. 2 illustrates the data elements of the listOfRelationship class in one embodiment.

FIG. 2 illustrates the data elements of the listOfRelationship class in one embodiment. The listOfRelationship class includes listOfRepresentedBy 201, listOfCustomerOf 203, listOfContactOf 205, listOfEmployeeOf 207, and listOfRelatedTo 209 data elements that contain zero or more instances of the corresponding data sub-elements 202, 204, 206, 208, and 210. The listOfRelationship class also includes a customData 211 data element with a type of listOfRelationshipCustomDataType that initially is defined to have no data elements.

Figure 3:
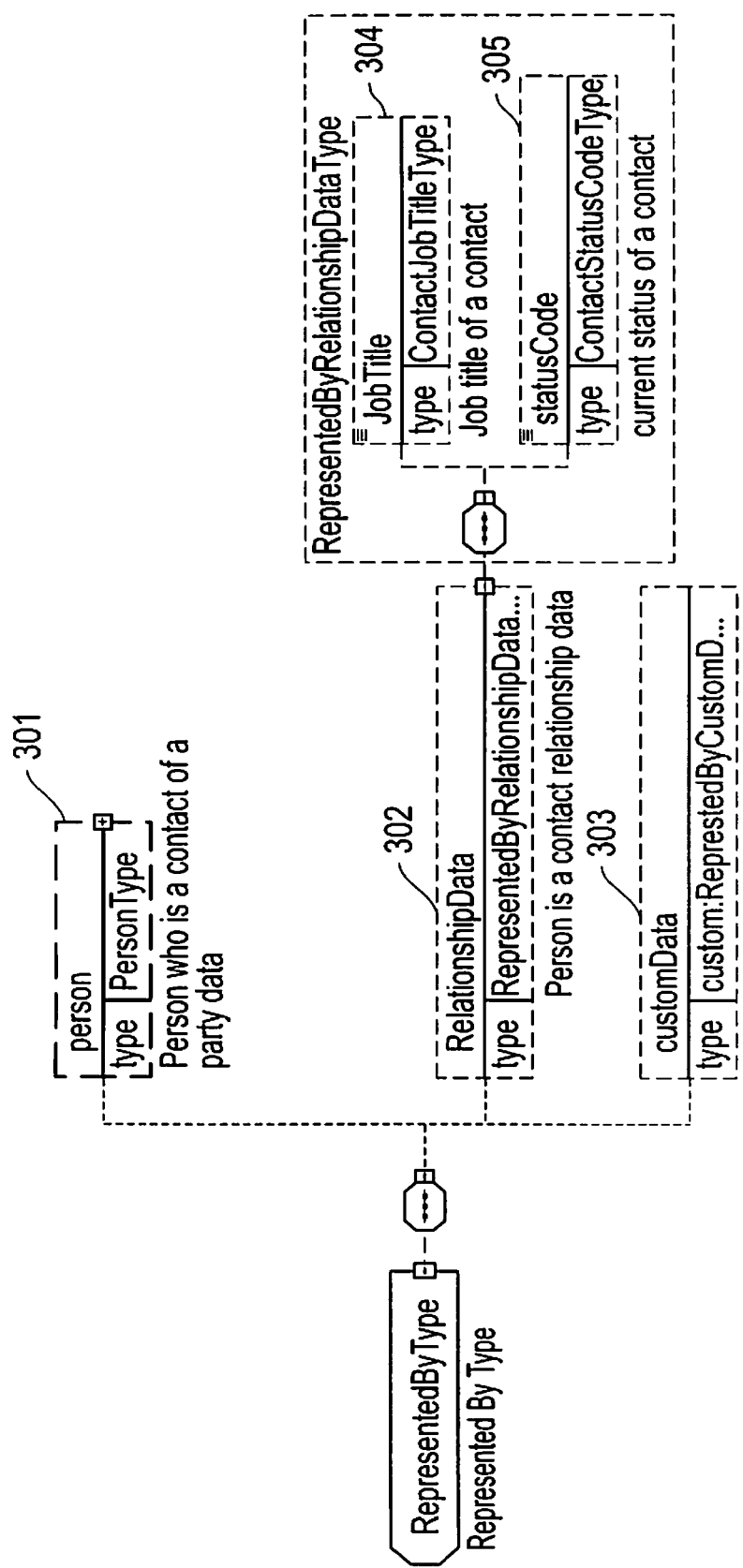
FIG. 3 illustrates the data elements of the RepresentedBy class in one embodiment.

FIG. 3 illustrates the data elements of the representedBy class in one embodiment. The representedBy class includes person 301, relationshipData 302, and customData 303 data elements. The relationshipData data element includes the jobTitle 304 and statuscode 305 data elements. Each of the customData data elements described in FIGS. 1-12 have a unique type that initially has no data elements defined.

Figure 4:
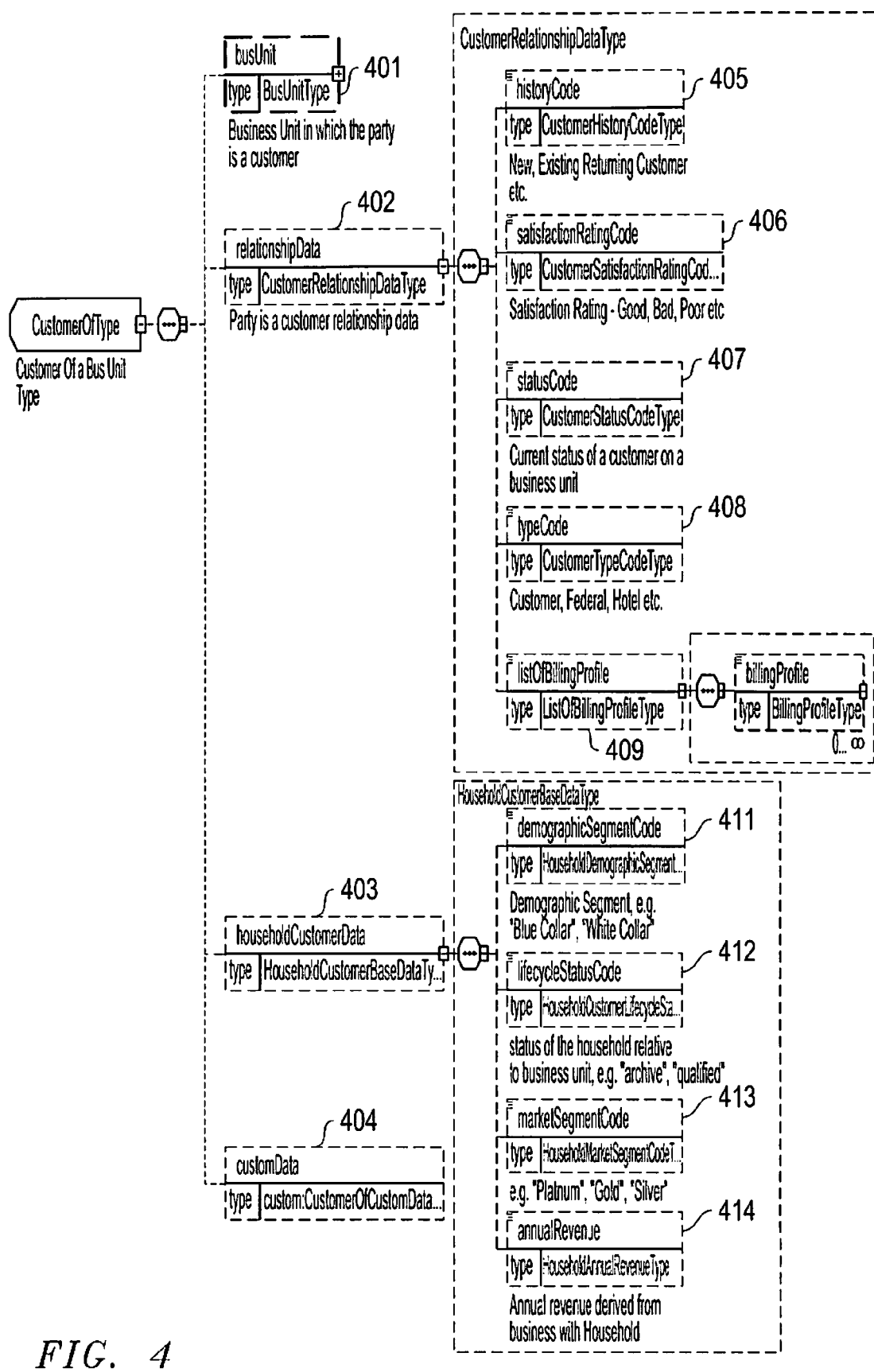
FIG. 4 illustrates the data elements of the customerOf class in one embodiment.

FIG. 4 illustrates the data elements of the customerOf class in one embodiment. The customerOf class includes busUnit 401, relationshipData 402, householdCustomerData 403, and customData 404 data elements. The busUnit data element identifies the business unit of which the party is a customer. The relationshipData data element includes historyCode 405 (e.g., new, existing, or returning), satisfactionRatingCode 406 (e.g., good or bad), statusCode 407 (i.e., current status of a customer in a business unit), typeCode 408 and listOfBillingProfile 409 (e.g., customer or federal) data elements. The householdCustomerData data element includes demographicSegmentCode 411 (e.g., blue collar), lifecycleStatusCode 412 (i.e., the status of the household relative to business unit, e.g., qualified), marketSegmentCode 413 (e.g., platinum or gold), and annualRevenue 414 (e.g., derived from business or household) data elements.

Figure 5:
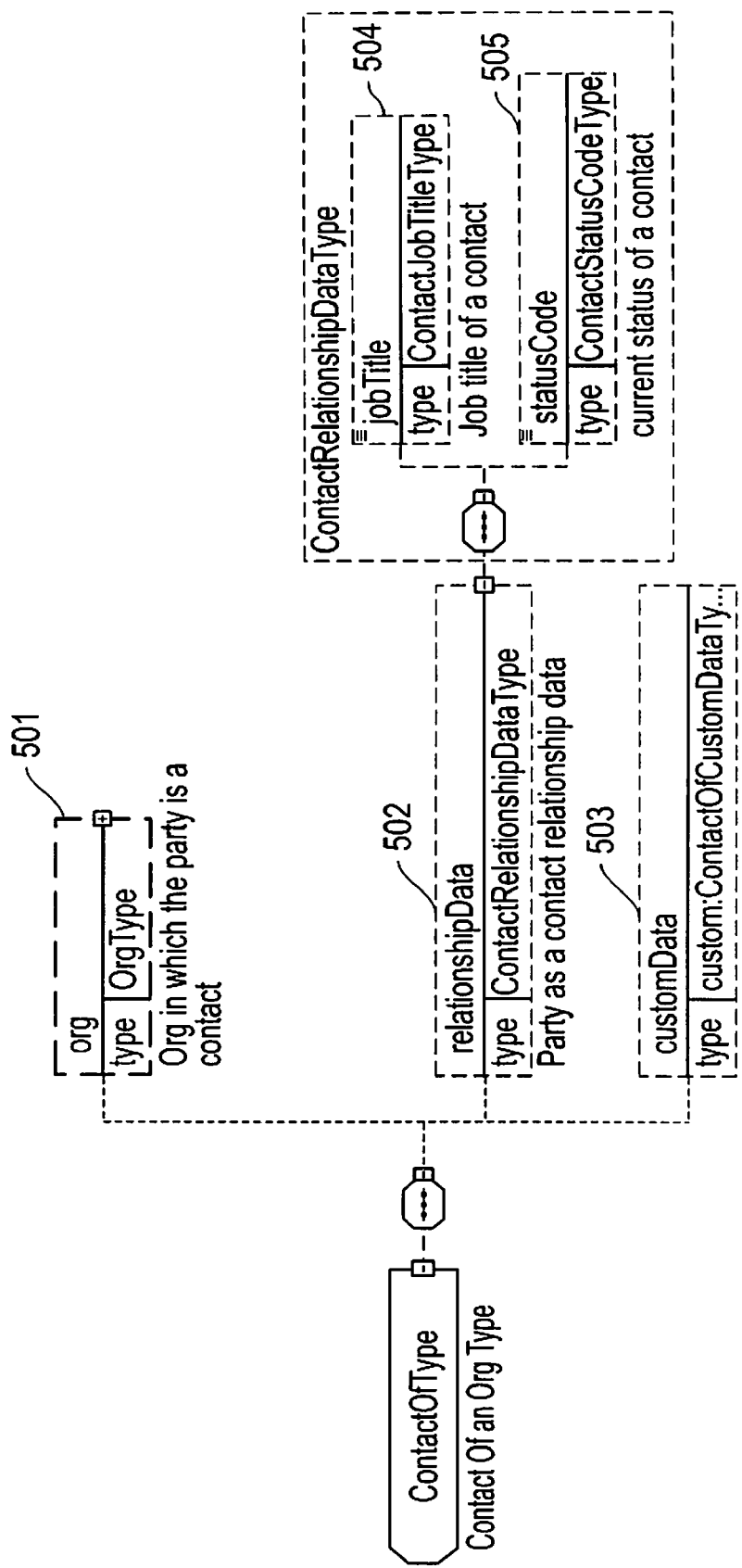
FIG. 5 illustrates the data elements of the contactOf class in one embodiment.

FIG. 5 illustrates the data elements of the contactOf class in one embodiment. The contactOf class includes org 501 (i.e., organization in which the party is a contact), relationshipData 502, and customData 503 data elements. The relationshipData data element includes jobTitle 504 and statusCode 505 (i.e., current status of a contact) data elements.

Figure 6:
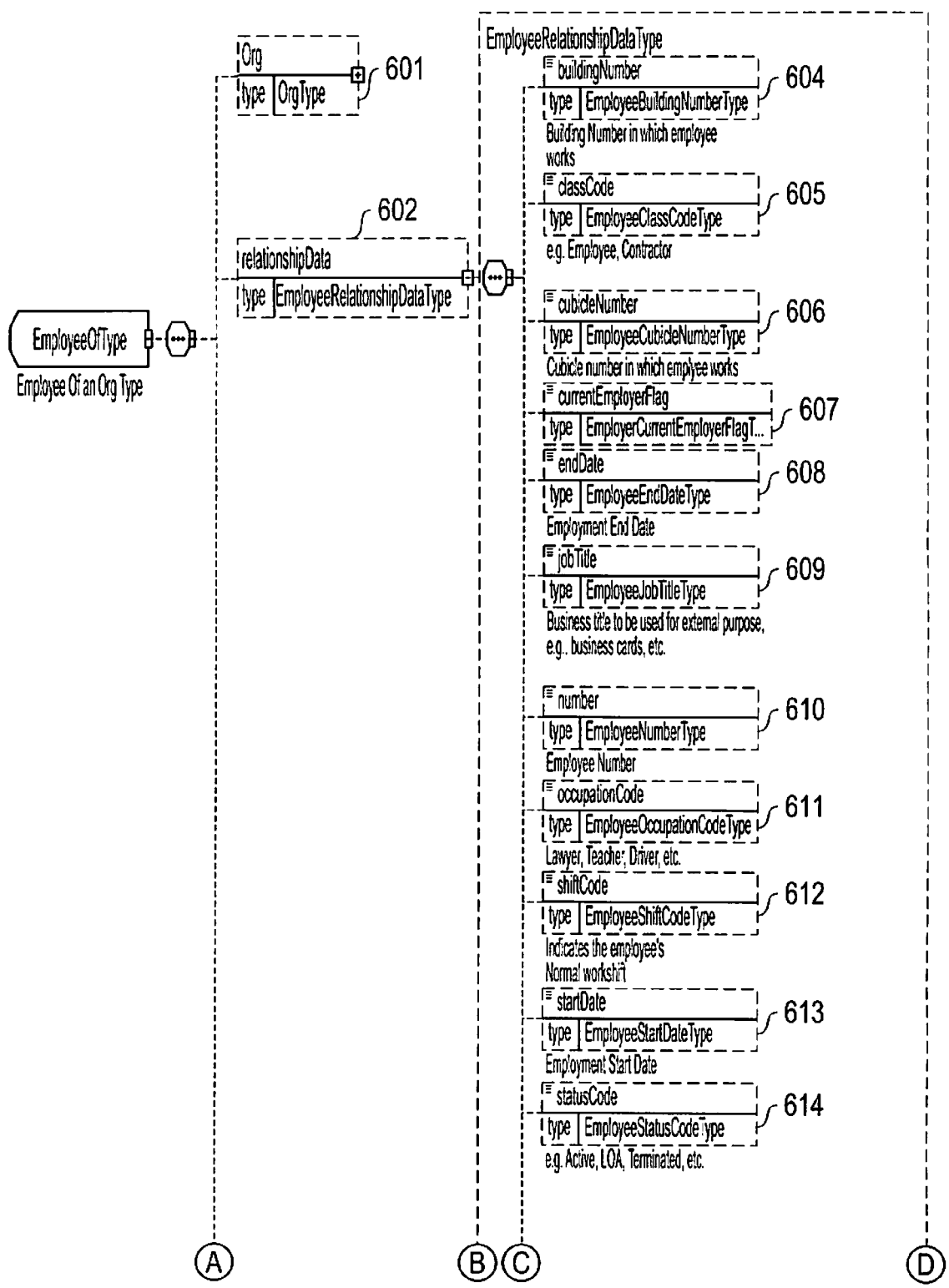
FIG. 6 illustrates the data elements of the employeeof class in one embodiment.
Figure 6:
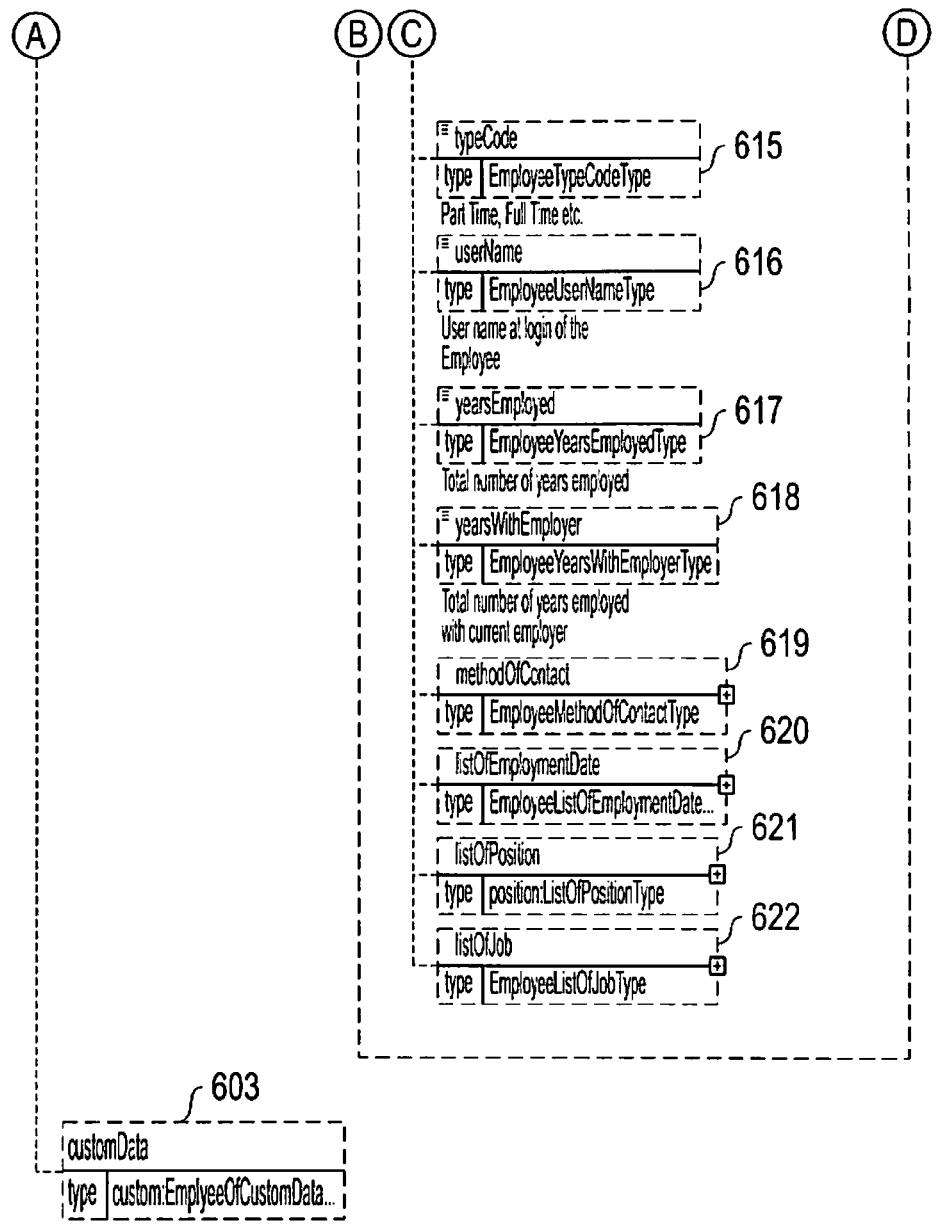

FIG. 6 illustrates the data elements of the employeeOf class in one embodiment. The employeeOf class includes org 601, relationshipData 602, and customData 603 data elements. The relationshipData data element includes buildingNumber 604 (i.e., building in which the employee works), classCode 605 (e.g., employee or contractor), cubicleNumber 606 (i.e., cubicle in which the employee works), currentEmployerFlag 607, employmentEndDate 608, jobTitle 609 (i.e., business title to be used for external purposes such as business cards), number 610 (i.e., employee number), occupationCode 611 (e.g., lawyer or teacher), shiftCode 612 (i.e., employee's normal work shift), startDate 613 (i.e., start date of employment), statusCode 614 (e.g., active or terminated), typeCode 615 (e.g., part time), userName 616 (i.e., login of employee), yearsEmployed 617 (i.e., total number of years employed), yearsWithEmployer 618 (i.e., total number of years employed by current employer), methodOfContact 619, listOfEmploymentDate 620, listOfPosition 621, and listOfJob 622.

Figure 6A:
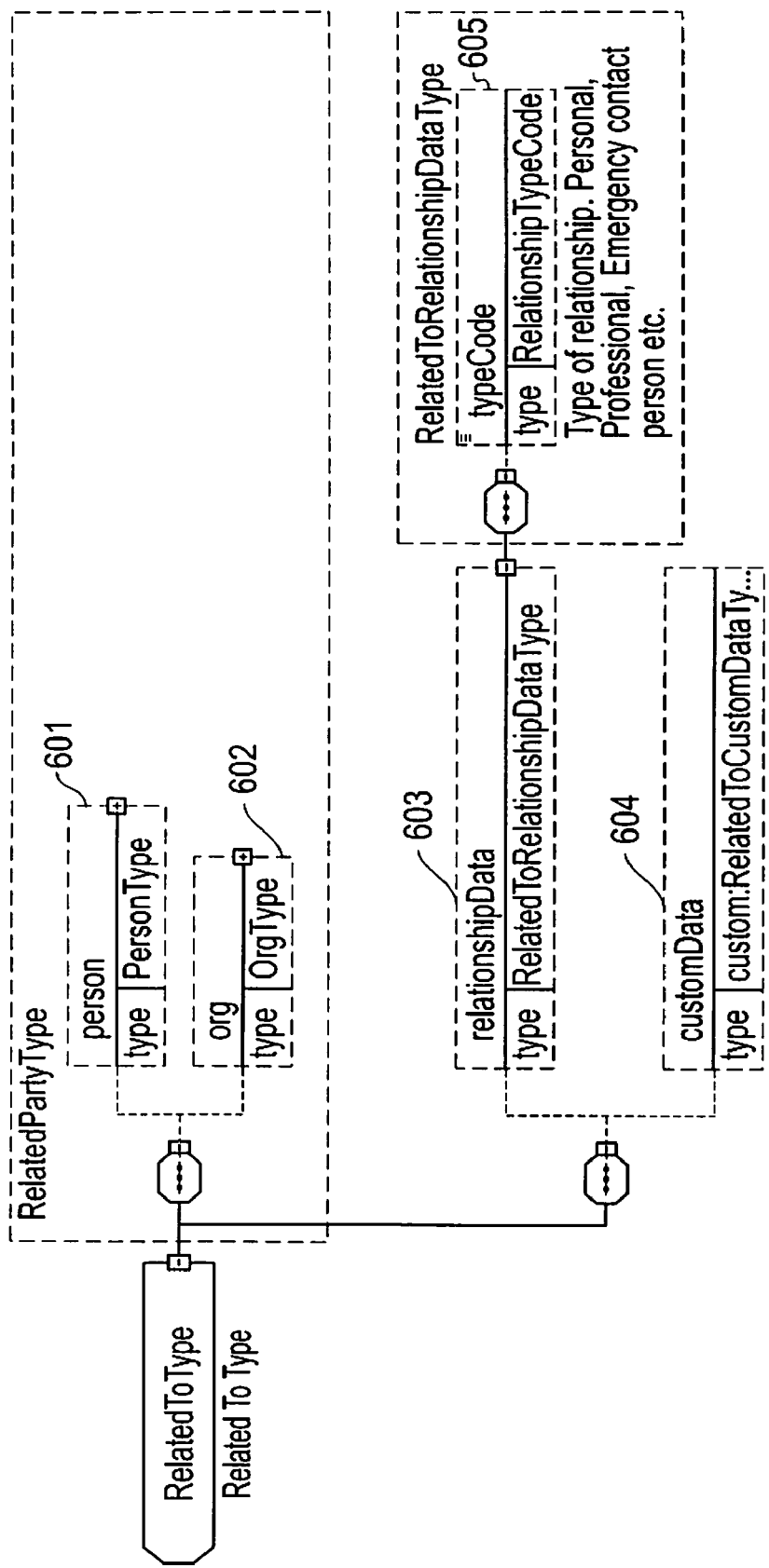
FIG. 6A illustrates the data elements of the relatedTo class in one embodiment.

FIG. 6A illustrates the data elements of the relatedto class in one embodiment. The relatedto class represents any generic relationship between a party and another party. The relatedTo class includes person 601 (i.e., person to which this party is related), org 602 (i.e., organization to which this party is related), relationshipData 603, and customData 604 data elements. The relationshipData data element includes a typecode 605 (i.e., type of relationship, such as personal or professional) data element.

Figure 6B:
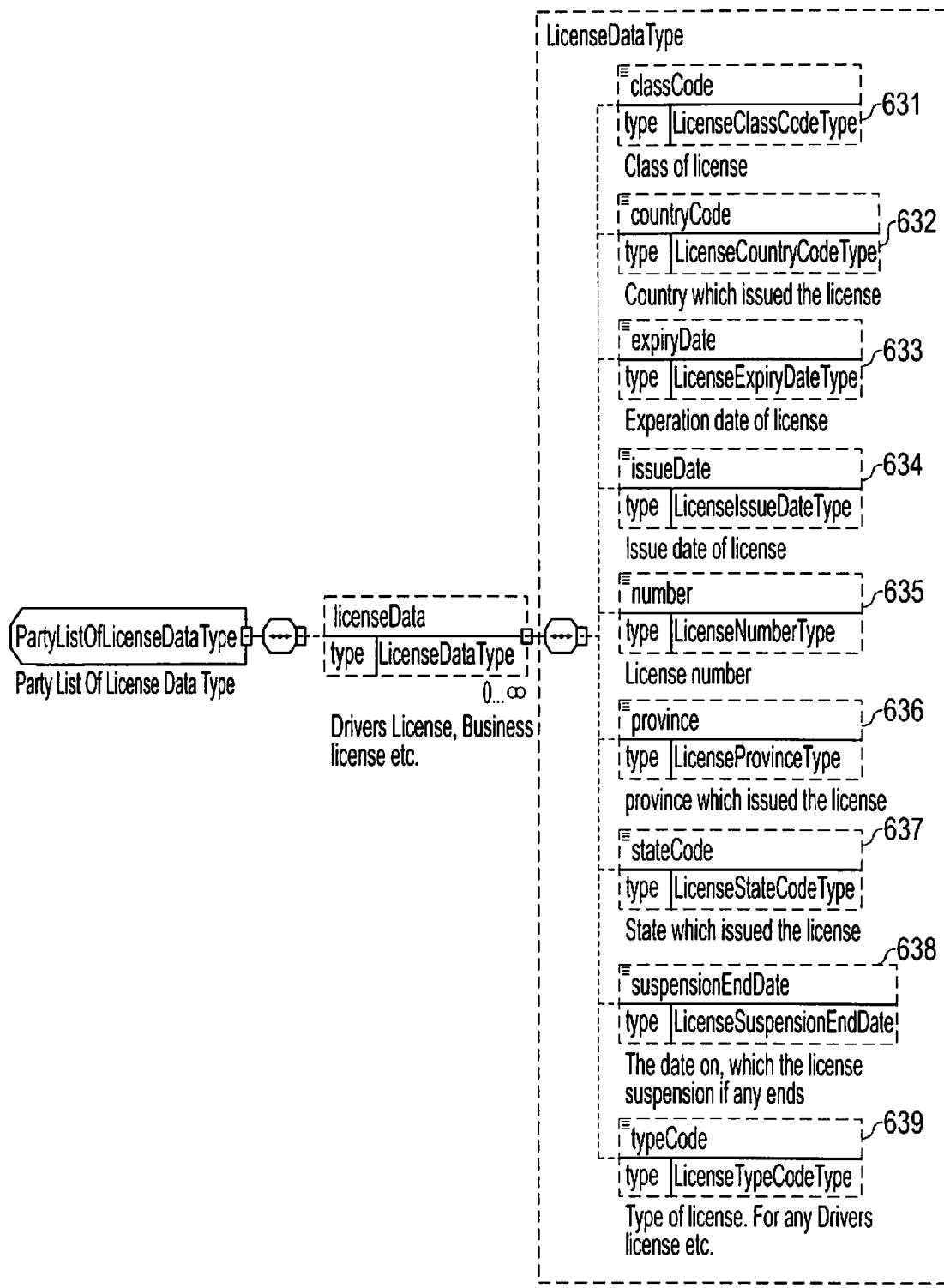
FIG. 6B illustrates the data elements of the licenseData class in one embodiment.

FIG. 6B illustrates the data elements of the licenseData class in one embodiment. The licenseData class includes a class code 631 (e.g., professional), countryCode 632, expiryDate 633, issueDate 634, number 635 (e.g., driver's license number), province 636, statecode 637, suspensionEndDate 638, and typeCode 639 (e.g., driver's license and physician's license).

Figure 7:
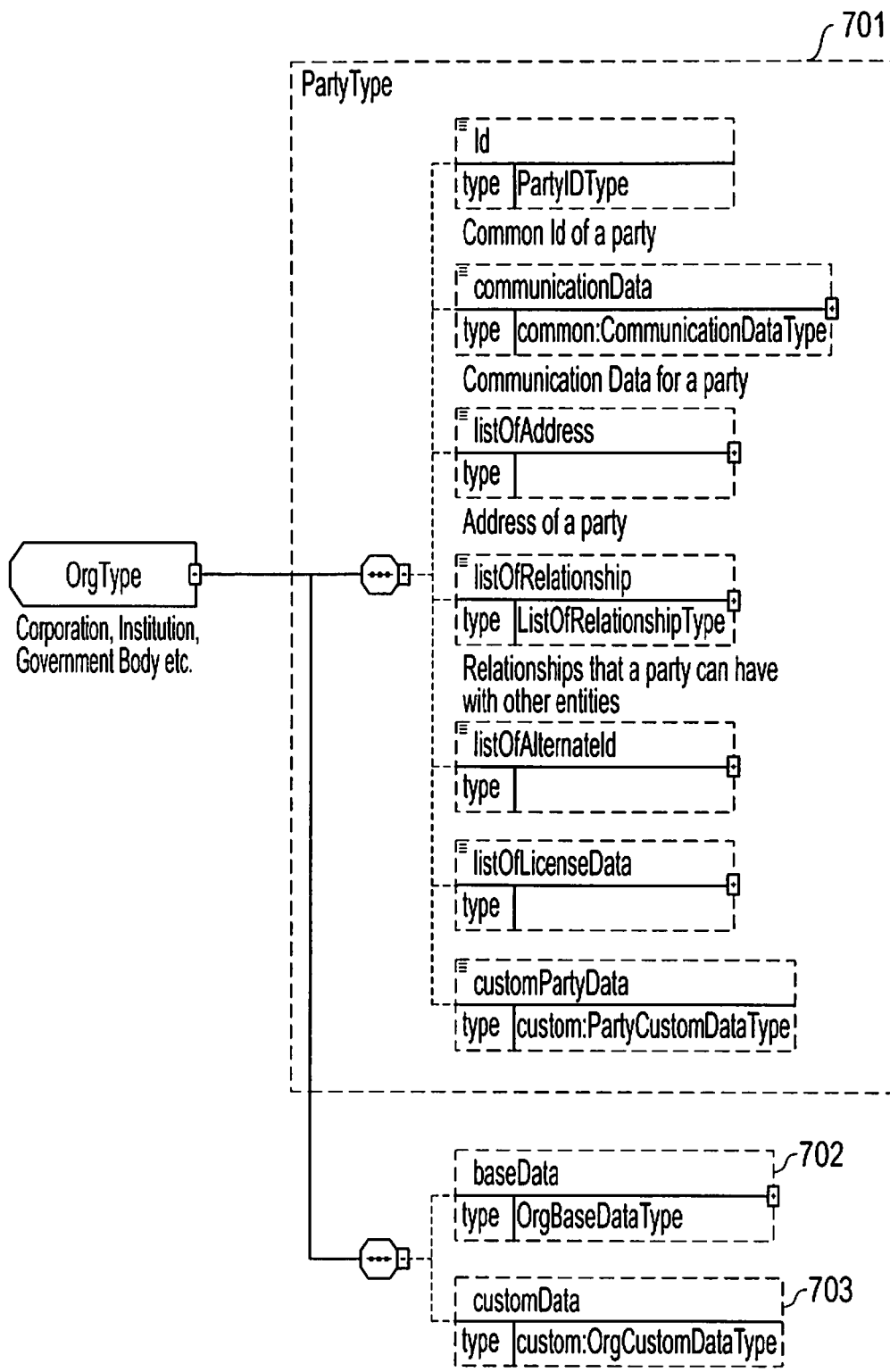
FIG. 7 illustrates the data elements of the org class.
Figure 8:
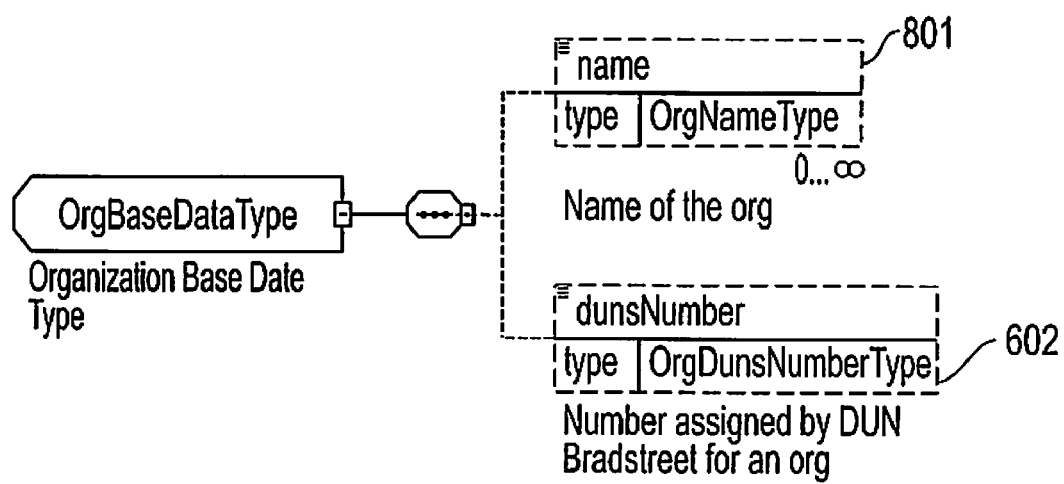
FIG. 8 illustrates the data elements of the baseData data element of the org class in one embodiment.

FIGS. 7-12 illustrates the inheritance of the party class by the classes of the entities. Each of these classes inherit the party class and defines a baseData element that is specific to that class and a customData data element. FIG. 7 illustrates the data elements of the org class in one embodiment. The org class inherits the party class 701 and includes baseData 702 and customData 703 data elements. FIG. 8 illustrates the data elements of the baseData data element of the org class in one embodiment. The base data element includes name 801 and dunsNumber 802 data elements.

Figure 9:
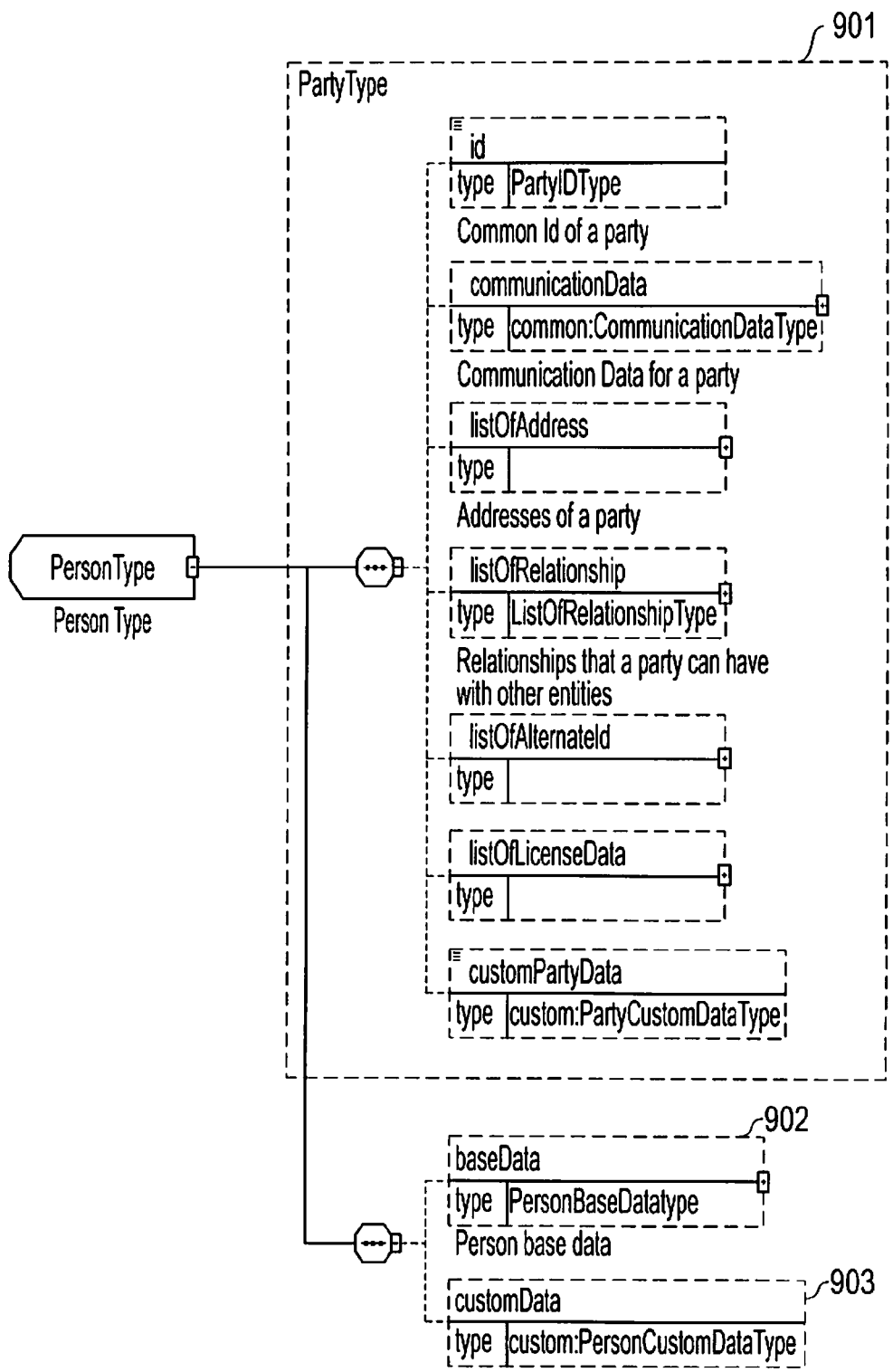
FIG. 9 illustrates the data elements of the person class.
Figure 10:
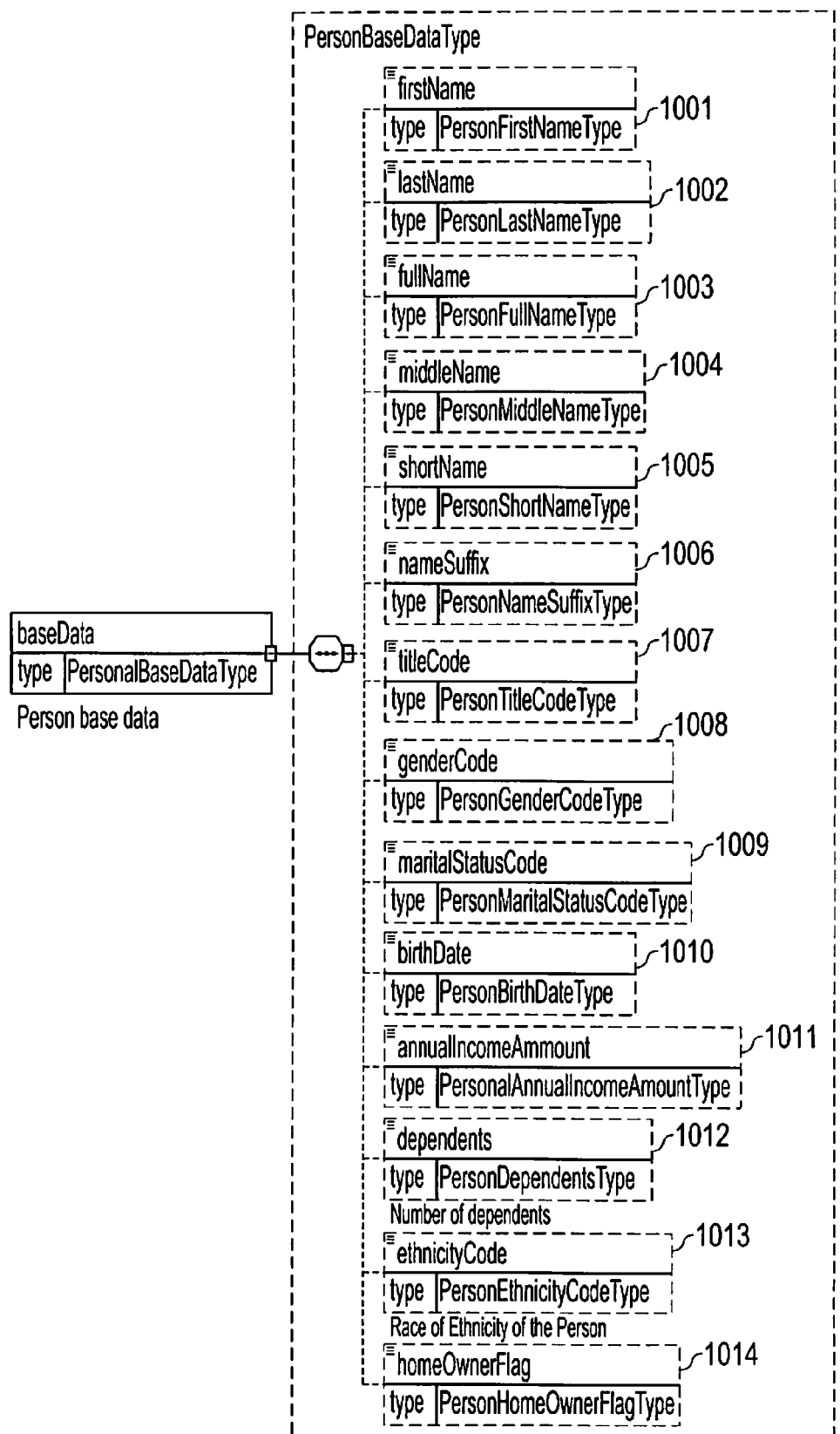
FIG. 10 illustrates a data elements of the baseData data element of the person class in one embodiment.

FIG. 9 illustrates the data elements of the person class. The person class inherits the party class 901 and includes baseData 902 and customData 903 data elements. FIG. 10 illustrates a data elements of the baseData data element of the person class in one embodiment. The baseData element includes firstName 1001, lastName 1002, fullName 1003, middleName 1004, shortName 1005, nameSuffix 1006, titleCode 1007, gendercode 1008, maritalStatusCode 1009, birthDate 1010, annualIncomdAmount 1011, dependents 1012, ethnicityCode 1013, and homeOwnerFlag 1014 data elements.

Figure 11:
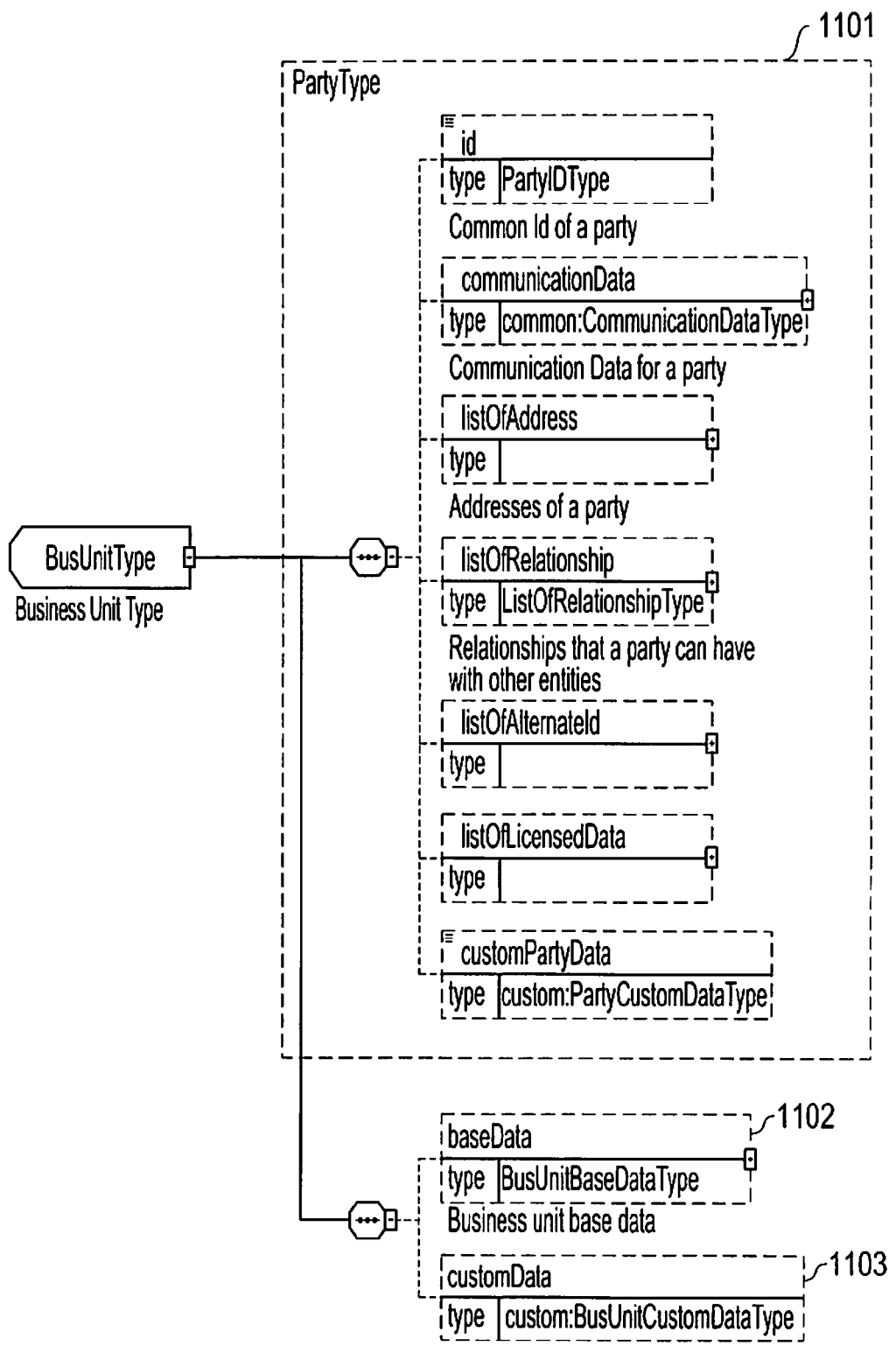
FIG. 11 illustrates the data elements of the busUnit class in one embodiment.
Figure 12:
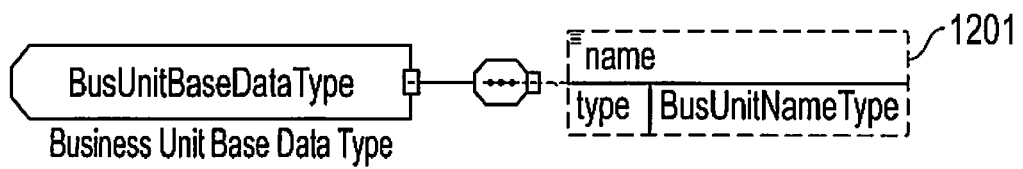
FIG. 12 illustrates the data elements of the baseData element of the busUnit class in one embodiment.

FIG. 11 illustrates the data elements of the busUnit class in one embodiment. The busUnit class inherits the party class 1101 and includes baseData 1102 and customData 1103 data elements. FIG. 12 illustrates the data elements of the baseData element of the busUnit class in one embodiment. The baseData data element includes name 1201 data element.

Figure 13:
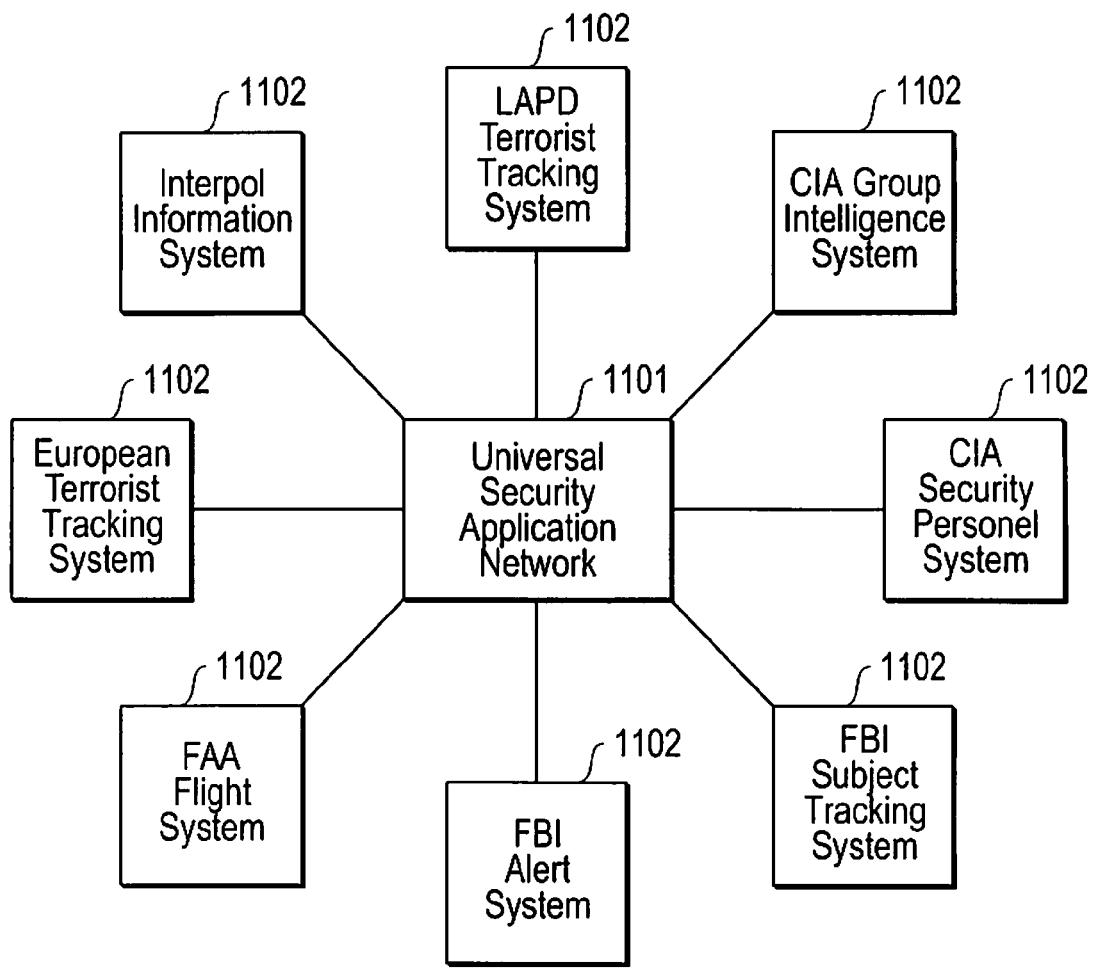
FIG. 13 is a block diagram illustrating the interconnection between business various systems and a universal business application network.

FIG. 13 is a block diagram illustrating the interconnection between business various systems and a universal business application network. The universal business application network 1301 serves as an integration hub for the business systems 1302. The architecture of the universal business application network allows new business applications that access legacy business systems to be developed with minimum customization. The legacy business systems can be provided by a single business organization or by different business organizations. The universal business application network also allows the business applications to exchange information using the party class. In one embodiment, the universal business application network uses the XML and Web services standards.

Figure 14:
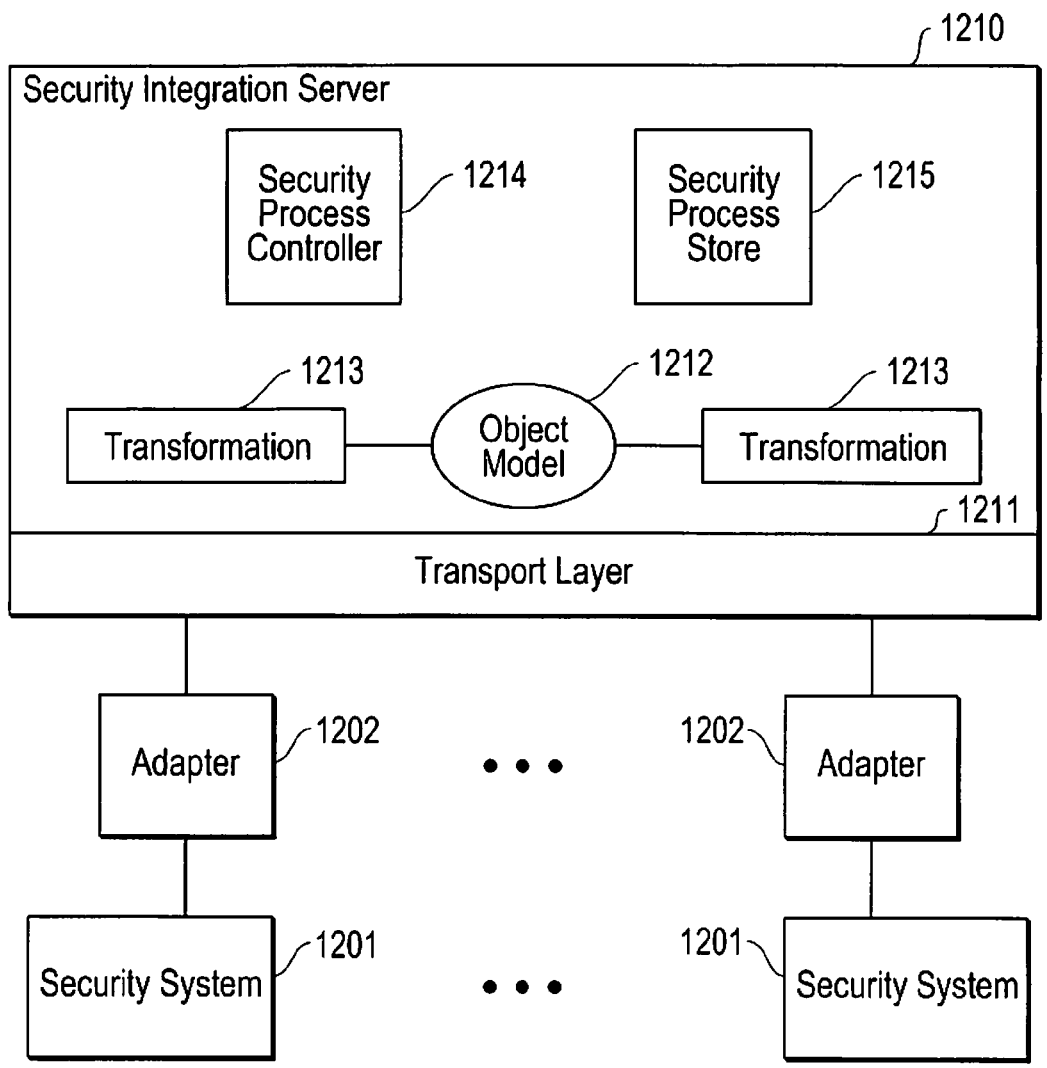
FIG. 14 is a block diagram illustrating the overall architecture of a universal business application network in one embodiment.

FIG. 14 is a block diagram illustrating the overall architecture of a universal business application network in one embodiment. The hub of the universal business application network is the business integration server 1410 that connects to the various business systems 1401 via adapters 1402. The business integration server includes a transport layer 1411, an object model 1412, a transformation store 1413, a business process controller 1414, and a business process store 1415. The transport layer is a mechanism through which business information is exchanged between the business systems and the business integration server. Each business system may have an adapter that is appropriate to the protocol of the transport layer. For example, the transport mechanism may use communications protocols such as TCP/IP. The transport layer may provide a messaging service for queuing, for guaranteeing delivery of messages, and for handling both synchronous and asynchronous messaging, such as provided by IBM MQSeries and TIBCO Rendezvous. The adapters relay events from the business systems to the integration server and can import configurations of the business systems into the business integration server. In addition, the universal business application network may include encryption and authentication mechanisms to ensure the security and integrity of the information. For example, authentication will help ensure that a business process is accessing the intended business system, rather than an impostor business system. The object model or data model may contain the definition of various business-related objects such as a party, a business unit, a household, an organization, and a person. The objects may be defined using standard object definition tools such as an XML schema definition tool. The transformation store contains transformations for transforming information received from the business systems to the format used by the object model, and vice versa. For example, a person object may include a globally unique identifier for each person. A transformation for a business system that does not use globally unique identifiers may need to access an identification server to determine the globally unique identifier for each person. The transformations may be specified as a computer program, an XML Stylesheet Language Transform ("XSLT"), etc. The business process store contains the business processes that have been defined. A business process may be specified as a script, a process flow, an executable program, etc. In one embodiment, the business processes are defined using the Web Services Flow Language ("WSFL"). The business processes orchestrate a sequence of steps across multiple applications provided by the business systems to achieve a business objective. The business process controller coordinates the execution of the business processes. The business process controller may instantiate objects and invoke functions of the objects in accordance with the various business processes. The business process controller may also initiate the execution of business processes based on predefined conditions and events. For example, the business process controller may launch a certain business process each time an alert is received. Although not shown, the business integration network may provide a standard library of business routines that may be invoked by the business processes. For example, a standard business routine might be to identify whether two person objects represent the same individual or to apply business rules to various objects and take the appropriate action as defined by those rules. The business integration server may also include various tools to facilitate the development of business processes. These tools may aid in the development of transformations, the defining of common objects, and the writing of process flows.

The computers (e.g., universal business application network computer and business systems computer) may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link.

Figure 15:
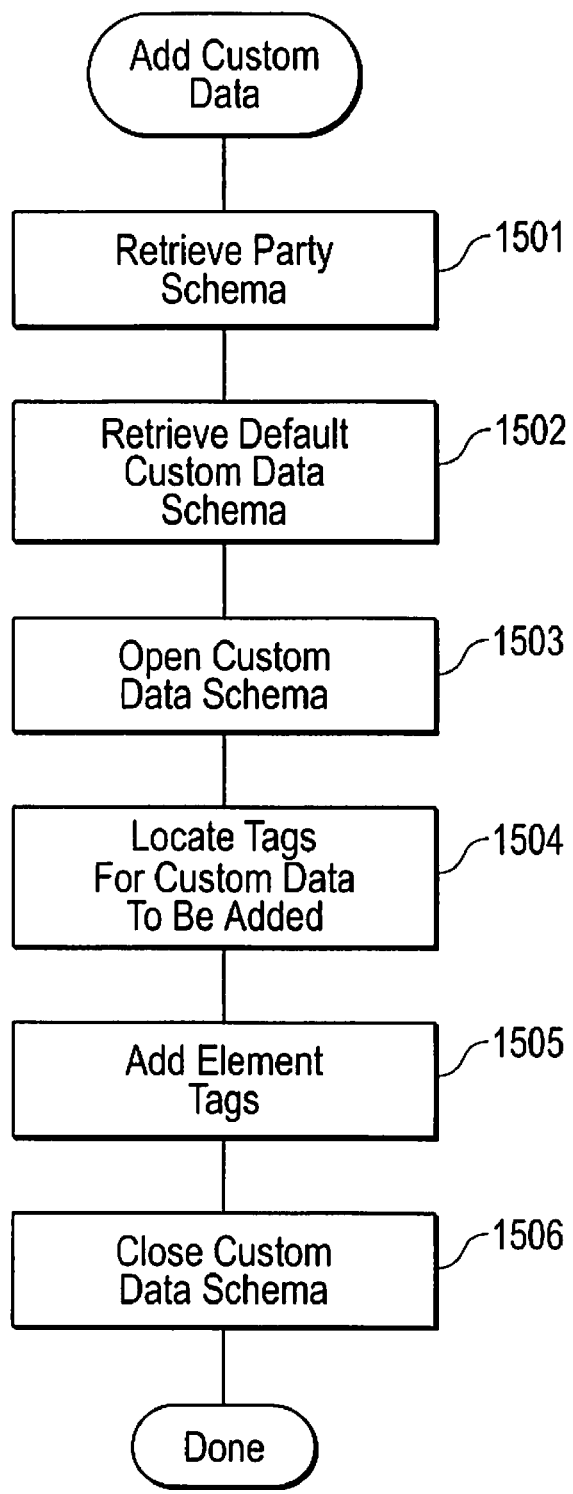
FIG. 15 is a flow diagram illustrating the process of adding custom data to a party class.

FIG. 15 is a flow diagram illustrating the process of adding custom data to a party class. In block 1501, the schema for the party class is retrieved. The schema may be an XML schema file that include a customData data element of a type that is defined in another file. In block 1502, the schema for the types of custom data is retrieved. The schema may be stored in an XML schema file that contains the definition for each type of custom data. In block 1503, the custom data schema is opened. In block 1504, the tags relating to the custom data type of interest are located. In block 1505, the custom data elements are added to the located tags. In block 1506, the custom data schema with the newly defined data elements to the custom data type is closed.

Figure 16:
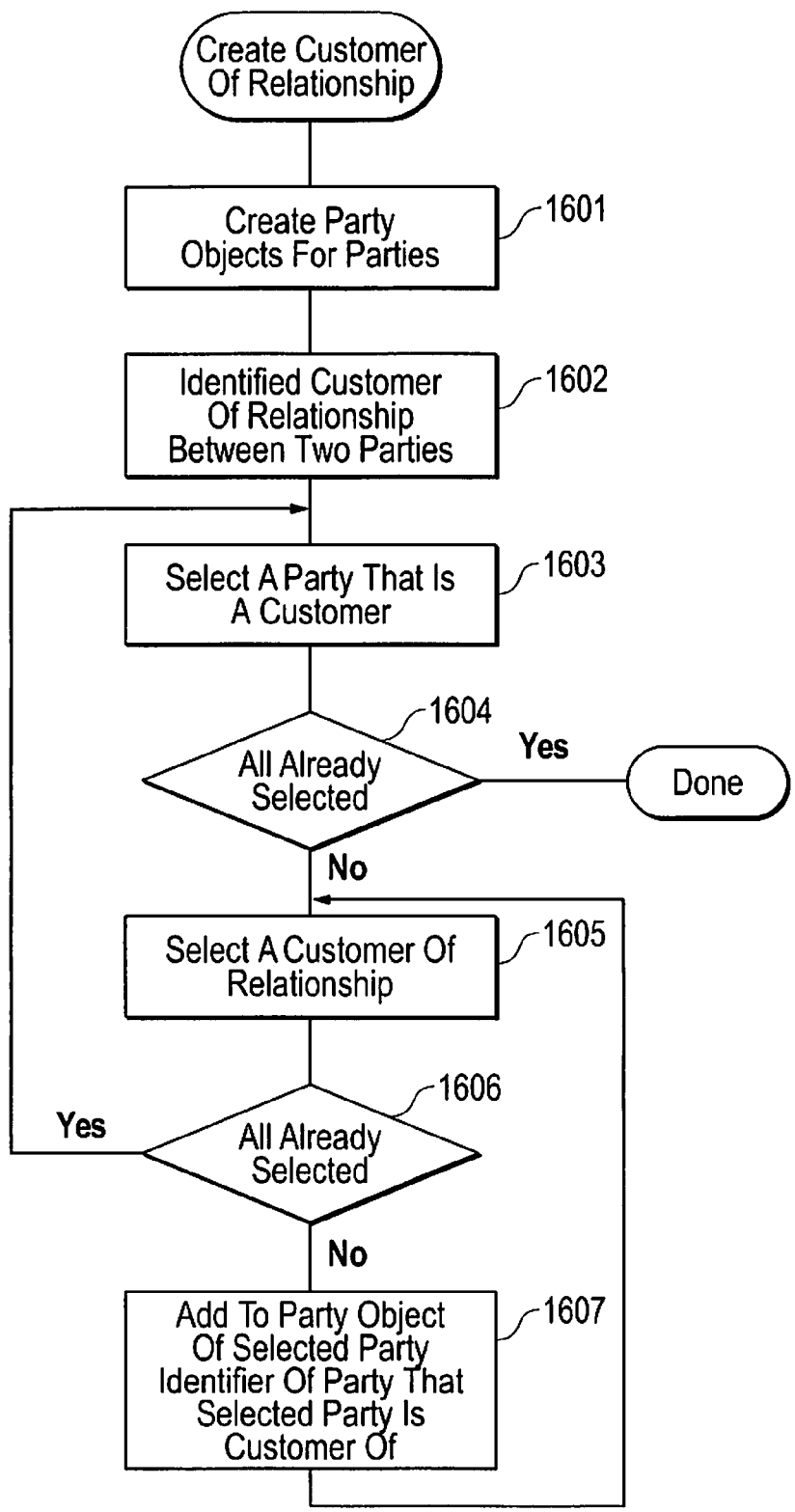
FIG. 16 is a flow diagram illustrating the process of creating a customer relationship for a party in one embodiment.

FIG. 16 is a flow diagram illustrating the process of creating a customer relationship for a party in one embodiment. In block 1601, the component creates party objects for various parties. In block 1602, the component identifies the customer relationships between parties. In block 1603, the component selects a party that is a customer in a customer relationship. In decision block 1604, if all such customers have already been selected, then the component completes, else component continues at block 1605. In block 1605, the component selects the next customer relationship for that party. In block 1606, if all the customer relationships for the selected party and party been selected, then the component loops to block 1603 to select the next party that has a customer relationship, else the component continues at block 1607. In block 1607, the component adds to the party object of the selected party the identifier of the party that the selected party is a customer of. The component than loops to block 1605 to select the next customer relationship for the selected party.

From the foregoing, it will be appreciated that although specific embodiment of technology have been described herein for purposes of illustration, various modifications may be made without deviating from the spirit and scope of the invention. For example, the class definitions that have been described using XML schema can be equivalently described using other class definition tools such as a $C^{++}$ class. The classes described can be instantiated in memory and be initialized with information. Accordingly, the invention is not limited except by the appended claims.

We claim:

1. A method in a computer system, the method comprising:
defining a customizable data model, comprising
    defining a class,
    defining a plurality of derived classes, wherein
        each of the plurality of derived classes are derived from the class, and
        at least two of the plurality of derived classes are directly derived from the class,
    creating a hierarchy of data elements, using a processor of the computer system, wherein
        the hierarchy of data elements comprises the class and the plurality of derived classes,
        the hierarchy of data elements comprises one or more levels of data elements, and
        the hierarchy of data elements is configured to facilitate an upgrade operation, and
    defining each data element of the one or more levels of data elements in the hierarchy of data elements as comprising a non-customizable portion and a customizable portion, wherein
        the customizable portion is configured to support additional data elements,
        the non-customizable portion is configured to support data elements other than the additional data elements, and
        the additional data elements are configured to permit customization of the customizable data model;
storing the customizable data model;
generating a definition of a derived class of the plurality of derived classes, wherein
    the definition defines a custom data element of the hierarchy of data elements, and
    the custom data element is configured to allow customization of a data element of the customizable data model;
storing the definition; and
customizing the customizable data model, wherein
    the customizing comprises
        retrieving the customizable data model,
        retrieving the definition, and
        adding the custom data element to the customizable portion of the data element of the customizable data model.

2. The method of claim 1 further comprising:
upgrading the customizable data model by performing the upgrade operation, wherein
    the upgrading results in an upgraded customizable data model,
    the customization is maintained after the upgrading, wherein maintaining the customization comprises
        retrieving the upgraded customizable data model,
        retrieving the definition, and
        adding the custom data element to the customizable portion of the data element of the customizable data model, and
    the custom data element of the upgraded customizable data model corresponds to the custom data element of the customizable data model.

3. The method of claim 2 further comprising:
defining a relationship between a first entity and a second entity,
wherein
the relationship is defined using the non-customizable portion and the customizable portion of one level of data elements from the one or more levels of data elements, and
the relationship is maintained after the upgrading.

4. The method of claim 1 wherein the customizable portion of the each of the one or more levels of data elements is created by adding data elements defining an entity.

5. The method of claim 1 wherein the hierarchy of data elements is specific to an entity type.

6. The method of claim 1 wherein one of the one or more levels of data elements comprises a party type corresponding to an entity.

7. The method of claim 6 wherein the non-customizable portion of the each of the one or more levels of data elements comprising a party type comprises:
a party identifier for the party type, and
a list of relationships of the party type.

8. The method of claim 1 further comprises:
defining a plurality of party types, wherein
each party type of the plurality of party types corresponds to a derived class of the plurality of derived classes, and
each party type of the plurality of party types is associated with at least one level of the one or more levels of data elements;
creating a plurality of parties using the plurality of party types; and
defining a relationship between a first party and a second party, wherein
the defining the relationship is performed
using the non-customizable portion and the customizable portion of the at least one level of the one or more levels of data elements associated with the first party, and
using the non-customizable portion and the customizable portion of the at least one level of the one or more levels of data elements associated with the second party.

9. A non-transitory computer-readable storage medium storing computer instructions, wherein the computer instructions, when executed, perform a method comprising:
defining a customizable data model, comprising
defining a class,
defining a plurality of derived classes, wherein
each of the plurality of derived classes are derived from the class, and
at least two of the plurality of derived classes are directly derived from the class, and
creating a hierarchy of data elements for representing the entity, wherein
the hierarchy of data elements comprises the class and the plurality of derived classes,
the hierarchy of data elements comprises one or more levels of data elements, and
the hierarchy of data elements is configured to facilitate an upgrade operation, and
defining each data element of the one or more levels of data elements in the hierarchy of data elements comprises a non-customizable portion and a customizable portion, wherein
the customizable portion is configured to support additional data elements,
the non-customizable portion is configured to support data elements other than the additional data elements, and
the additional data elements are configured to permit customization of the customizable data model;
storing the customizable data model;
generating a definition of a derived class of the plurality of derived classes, wherein
the definition defines a custom data element of the hierarchy of data elements, and
the custom data element is configured to allow customization of a data element of the customizable data model;
storing the definition; and
customizing the customizable data model, wherein
the customizing comprises
retrieving the customizable data model,
retrieving the definition, and
adding the custom data element to the customizable portion of the data element of the customizable data model.

10. The non-transitory computer-readable storage medium of claim 9 further comprising:
upgrading the customizable data model by performing the upgrade operation, wherein
the upgrading results in an upgraded customizable data model,
the customization is maintained after the upgrading, wherein
maintaining the customization comprises
retrieving the upgraded customizable data model,
retrieving the definition, and
adding the custom data element to the customizable portion of the data element of the customizable data model, and
the custom data element of the upgraded customizable data model corresponds to the custom data element of the customizable data model.

11. The non-transitory computer-readable storage medium of claim 10 further comprising:
a relationship between a first entity and a second entity, wherein
the relationship is defined using the non-customizable portion and the customizable portion of one level of data elements from the one or more levels of data elements, and
the relationship is maintained after the upgrading.

12. The non-transitory computer-readable storage medium of claim 9 wherein the customizable portion of the each of the one or more levels of data elements is created by adding data elements defining an entity.

13. The non-transitory computer-readable storage medium of claim 9 wherein the hierarchy of data elements is specific to an entity type.

14. The non-transitory computer-readable storage medium of claim 9 wherein one of the one or more levels of data elements comprises a party type corresponding to an entity.

15. The non-transitory computer-readable storage medium of claim 14 wherein the non-customizable portion of the each of the one or more levels of data elements comprising a party type comprises:
a party identifier for the party type, and
a list of relationships of the party type.

16. The non-transitory computer-readable storage medium of claim 9 further comprising:
   defining a plurality of party types, wherein
   each party type of the plurality of party types corresponds to a derived class of the plurality of derived classes, and
   each party type of the plurality of party types is associated with at least one level of the one or more levels of data elements;
   creating a plurality of parties using the plurality of party types; and
   defining a relationship between a first party and a second party, wherein
   the defining the relationship is performed
   using the non-customizable portion and the customizable portion of the at least one level of the one or more levels of data elements associated with the first party, and
   using the non-customizable portion and the customizable portion of the at least one level of the one or more levels of data elements associated with the second party.

* * * * *

UNITED STATES PATENT AND TRADEMARK OFFICE
CERTIFICATE OF CORRECTION

| | |
|---|---|
| PATENT NO. | : 7,856,454 B2 |
| APPLICATION NO. | : 10/396730 |
| DATED | : December 21, 2010 |
| INVENTOR(S) | : Maria Theresa Barnes Leon et al. |

It is certified that error appears in the above-identified patent and that said Letters Patent is hereby corrected as shown below:

On the Title Page

On page 2, in Item 56 under "Other Publications", line 21, delete "entriched" and insert -- enriched --, therefor.

On page 2, in Item 56 under "Other Publications", line 24, delete "Conventry:" and insert -- Coventry: --, therefor.

On sheet 2 of 19, in Figure 2, Reference Numeral 205, line 1, delete "Contract" and insert -- Contact --, therefor.

On sheet 2 of 19, in Figure 2, line 12, delete "of" and insert -- Of --, therefor.

On sheet 3 of 19, in Figure 3, Reference Numeral 303, line 2, delete "Represted" and insert -- Represented --, therefor.

On sheet 9 of 19, in Figure 6B, line 10, delete "Experation" and insert -- Expiration --, therefor.

On sheet 13 of 19, in Figure 10, Reference Numeral 1011, line 1, delete "Ammount" and insert -- Amount --, therefor.

On sheet 13 of 19, in Figure 10, Reference Numeral 1011, line 2, delete "Personal" and insert -- Person --, therefor.

On sheet 16 of 19, in Figure 13, Reference Numeral 1012, line 3, delete "Personel" and insert -- Personnel --, therefor.

In column 2, line 1, delete "employeeof" and insert -- employeeOf --, therefor.

Signed and Sealed this
Twenty-seventh Day of September, 2011

David J. Kappos
*Director of the United States Patent and Trademark Office*

CERTIFICATE OF CORRECTION (continued)
U.S. Pat. No. 7,856,454 B2

In column 2, line 11, delete "a" and insert -- the --, therefor.

In column 6, line 21, delete "listOfAlternateId" and insert -- listOfAlternateId --, therefor.

In column 6, line 33-34, delete "listOfAlternateId" and insert -- listOfAlternateId --, therefor.

In column 6, line 55, delete "statuscode" and insert -- statusCode --, therefor.

In column 7, line 33, delete "relatedto" and insert -- relatedTo --, therefor.

In column 7, line 34, delete "relatedto" and insert -- relatedTo --, therefor.

In column 7, line 39-40, delete "typecode" and insert -- typeCode --, therefor.

In column 7, line 47, delete "statecode" and insert -- stateCode --, therefor.

In column 7, line 67, delete "gendercode" and insert -- genderCode --, therefor.

In column 8, line 1, delete "annualIncomdAmount" and insert -- annualIncomeAmount --, therefor.